(12) United States Patent
Lin et al.

(10) Patent No.: US 12,504,675 B2
(45) Date of Patent: Dec. 23, 2025

(54) TRIPOD-HEAD STRUCTURE

(71) Applicant: LIANHONG ART CO., LTD., Taoyuan (TW)

(72) Inventors: Tzu-Yu Lin, Taoyuan (TW); Ching-Jung Lai, Taoyuan (TW); Yen-Ting Lai, Taoyuan (TW)

(73) Assignee: LIANHONG ART CO., LTD., Taoyuan (TW)

( * ) Notice: Subject to any disclaimer, the term of this patent is extended or adjusted under 35 U.S.C. 154(b) by 183 days.

(21) Appl. No.: 18/228,289

(22) Filed: Jul. 31, 2023

(65) Prior Publication Data

US 2025/0044668 A1 Feb. 6, 2025

(51) Int. Cl.
*G03B 17/56* (2021.01)
*F16M 11/10* (2006.01)

(52) U.S. Cl.
CPC ......... *G03B 17/561* (2013.01); *F16M 11/105* (2013.01); *F16M 2200/022* (2013.01)

(58) Field of Classification Search
CPC .... G03B 17/56; G03B 17/561; G03B 17/566; F16M 11/041; F16M 11/06; F16M 11/10; F16M 11/105; F16M 11/2007; F16M 11/2021; F16M 11/2028; F16M 13/02; F16M 13/022; F16M 2200/02; F16M 2200/021; F16M 2200/022; F16M 2200/024
See application file for complete search history.

(56) References Cited

FOREIGN PATENT DOCUMENTS

| CN | 2935204 Y | * | 8/2007 |
| CN | 204677995 U | * | 9/2015 |
| CN | 105208260 A | | 12/2015 |
| CN | 213018567 U | | 4/2021 |

OTHER PUBLICATIONS

PCT search report dated Dec. 21, 2023 of the corresponding PCT patent application No. PCT/CN2023/100634.

* cited by examiner

*Primary Examiner* — Stephanie E Bloss
*Assistant Examiner* — Fang-Chi Chang
(74) *Attorney, Agent, or Firm* — HDLS IPR SERVICES; Chun-Ming Shih

(57) ABSTRACT

A tripod-head structure includes a first clamping plate, a second clamping plate, a rotating base, a tightening element, and an adjustment component. The first clamping plate includes a first arc-shaped groove, and the second clamping plate includes a second arc-shaped groove. A portion of a slide rail of the rotating base is placed between the first arc-shaped groove and the second arc-shaped groove. The tightening element passes through the first clamping plate and the second clamping plate. The adjustment component is connected to the tightening element and switchable between an unlocked position and a locked position. In the unlocked position, the slide rail is slidable to adjust an angle of the rotating base. In the locked position, the tightening element presses the first clamping plate and the second clamping plate to tightly secure the slide rail for rapid adjustment of the angle of the rotating base.

11 Claims, 21 Drawing Sheets

TRIPOD-HEAD STRUCTURE

BACKGROUND OF THE DISCLOSURE

Technical Field

The present disclosure relates to a tripod-head structure, in particular to a tripod-head structure designed to support a photographic device and enable multi-angle rotation and adjustment.

Description of Related Art

Photographic devices, such as mobile phones, single-lens cameras, digital cameras, or video cameras, are extensively used in our daily lives. Generally, in order to prevent the image quality from being affected by hand shake or movement during shooting, it is common practice to mount the photographic device onto a tripod head of a tripod. This arrangement ensures that the photographic device can provide a stable shooting experience.

However, most commonly used tripod heads reply on a ball head design, limiting the rotation to the center of a ball plug and restricting the flexibility of adjusting the photographic device. In addition, the ball-type tripod head can only allow for horizontal shooting of the photographic device, but cannot be adjusted to accommodate vertical or even oblique shooting. Therefore, there is an urgent need for an improved tripod-head structure that can be easily installed on related-art tripods, enabling quick and straightforward multi-angle rotation to support vertical shooting and oblique shooting.

Accordingly, the inventor of the present disclosure has recognized the shortcomings of the related-art techniques. With a dedicated focus on research and the application of relevant knowledge, the inventor has made every effort to address the aforementioned issues, making them the primary objectives of the improvements pursued in this disclosure.

SUMMARY OF THE DISCLOSURE

It is a main objective of the present disclosure to enable easy and quick multi-angle rotation adjustment of a rotating base.

Accordingly, the present disclosure provides a tripod-head structure for holding a photographic device. The tripod-head structure includes a first clamping plate, a second clamping plate, a rotating base, a tightening element, and an adjustment component. The first clamping plate is provided with a first arc-shaped groove. The second clamping plate is disposed corresponding to the first clamping plate and provided with a second arc-shaped groove. The rotating base includes a mounting platform and a slide rail, wherein the photographic device is mounted on the mounting platform, the slide rail is vertically connected to the mounting platform, and a portion of the slide rail is disposed between the first arc-shaped groove and the second arc-shaped groove. The tightening element passes through the first clamping plate and the second clamping plate. The adjustment component is disposed in the second clamping plate and connected to the tightening element, wherein the adjustment component is switchable between an unlocked position and a locked position. When the adjustment component is in the unlocked position, the slide rail is slidable between the first arc-shaped groove and the second arc-shaped groove to adjust an angle of the rotating base. When the adjustment component is in the locked position, the tightening element presses the first clamping plate and the second clamping plate together to clamp and secure the slide rail between the first arc-shaped groove and the second arc-shaped groove.

According to one embodiment of the present disclosure, the slide rail includes a main body, a connecting portion, and a limiting portion, the connecting portion extends perpendicularly from an outer edge of the main body and is connected to the limiting portion, the limiting portion gradually extends outward from the connecting portion, and profiles of the first arc-shaped groove and the second arc-shaped groove fit contours of the connecting portion and the limiting portion.

According to one embodiment of the present disclosure, the adjustment component includes a rotary knob, a sleeve, and a positioning pin, the rotary knob is connected to the sleeve, the sleeve includes a notch and a blind hole communicating with each other, the positioning pin is inserted into the blind hole and includes a screw hole arranged corresponding to the notch, the first clamping plate includes a first through slot, the second clamping plate includes a containing channel and a second through slot communicating with each other, the sleeve is rotatably inserted in the containing channel, the rotary knob is exposed from the second clamping plate, and the tightening element passes through the first through slot, the second through slot, and the notch in sequence and is threadedly fastened to the screw hole.

According to one embodiment of the present disclosure, the positioning pin and the sleeve are disposed eccentrically.

According to one embodiment of the present disclosure, the adjustment component includes a lever and a positioning pin, the lever includes a rotating portion, the rotating portion includes a notch and a through hole communicating with each other, the positioning pin is inserted into the through hole and includes a screw hole arranged corresponding to the notch, the first clamping plate includes a first through slot, the second clamping plate includes a containing channel and a second through slot communicating with each other, the rotating portion is rotatably accommodated in the containing channel, and the tightening element passes through the first through slot, the second through slot, and the notch in sequence and is threadedly fastened to the screw hole.

According to one embodiment of the present disclosure, the positioning pin and the rotating portion are disposed eccentrically.

According to one embodiment of the present disclosure, the tightening element is a shoulder bolt.

According to one embodiment of the present disclosure, the adjustment component includes a rotating handle, a fastening element, a blocking plate, and a compression spring, the rotating handle includes a rotating portion, two ends of the rotating portion are respectively provided with a blind hole and a recess arranged corresponding to each other and communicating with each other, the first clamping plate includes a screw hole, the second clamping plate includes a containing channel and a second through slot communicating with each other, the rotating portion is rotatably accommodated in the containing channel, the tightening element includes an insertion section, a contact section, and a threaded section connected sequentially, the contact section abuts against a bottom of the blind hole and a bottom of the containing channel so that the insertion section is accommodated in the recess, the fastening element fastens the blocking plate to the insertion section, the compression spring sheathe the insertion section, the compression spring is pre-pressingly and elastically abuts against between a bottom of the recess and the blocking plate, and the threaded section passes through the second through slot and is threadedly fastened to the screw hole.

According to one embodiment of the present disclosure, the slide rail is circular-shaped or arc-shaped.

According to one embodiment of the present disclosure, the tripod-head structure further includes a plurality of bolts, the first clamping plate includes a plurality of positioning holes, the second clamping plate includes a plurality of threaded studs, each of the threaded studs is inserted in one of the positioning holes from one side of the first clamping plate, and each of the bolts is inserted into one of the positioning holes from another side of the first clamping plate and is fastened to one of the threaded studs.

The tripod-head structure of the present disclosure allows the adjustment component to be switched between the unlocked position and the locked position, thereby enabling the tightening element to loosen or tighten the first clamping plate and the second clamping plate. This enables the slide rail to slide between the first arc-shaped groove and the second arc-shaped groove or to be securely clamped between the first arc-shaped groove and the second arc-shaped groove, achieving a simple and quick multi-angle rotation adjustment of the rotating base.

DETAILED DESCRIPTION

Figure 1:
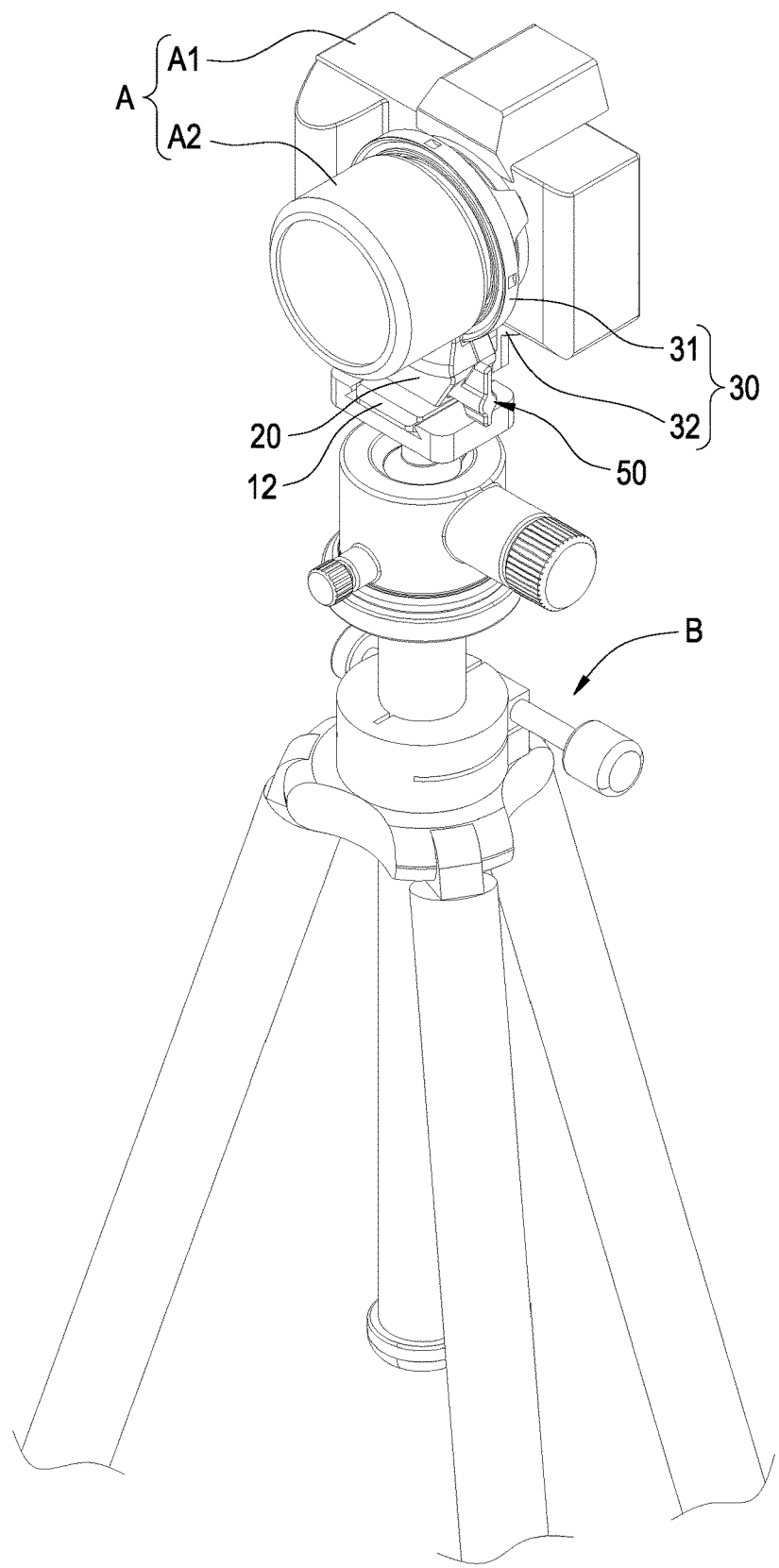
FIG. 1 is a perspective view illustrating a photographic device and a tripod according to a first embodiment of the present disclosure.

In the present disclosure, it should be understood that directional terms such as "front side", "rear side", "left side", "right side", "front end", "rear end", "end", "longitudinal", "transverse", "vertical", "top", and "bottom" should be construed to refer to the orientations or the positions as described or as illustrated in the drawings under discussion. These terms are only used to simplify description of the present disclosure, and do not indicate or imply that the device or element referred to must have a particular orientation, or constructed or operated in a particular orientation. Thus, these terms cannot be considered as limitations to the present disclosure.

In the present disclosure, wordings, such as "first", "second", "third", "fourth", and "fifth", describe various elements, components, regions, layers and/or sections. However, the elements, components, regions, layers and/or sections should not be limited by these wordings. The wordings may be only used to distinguish one element, component, region, layer, or section from another. The wordings such as "first", "second", "third", "fourth", and "fifth" used herein do not imply a sequence or order unless clearly indicated by the context.

The technical contents of the present disclosure are described below with reference to accompanying drawings. The accompanying drawings are provided for the illustrative purpose only, but not intended to limit the protection scope of the present disclosure.

Figure 2:
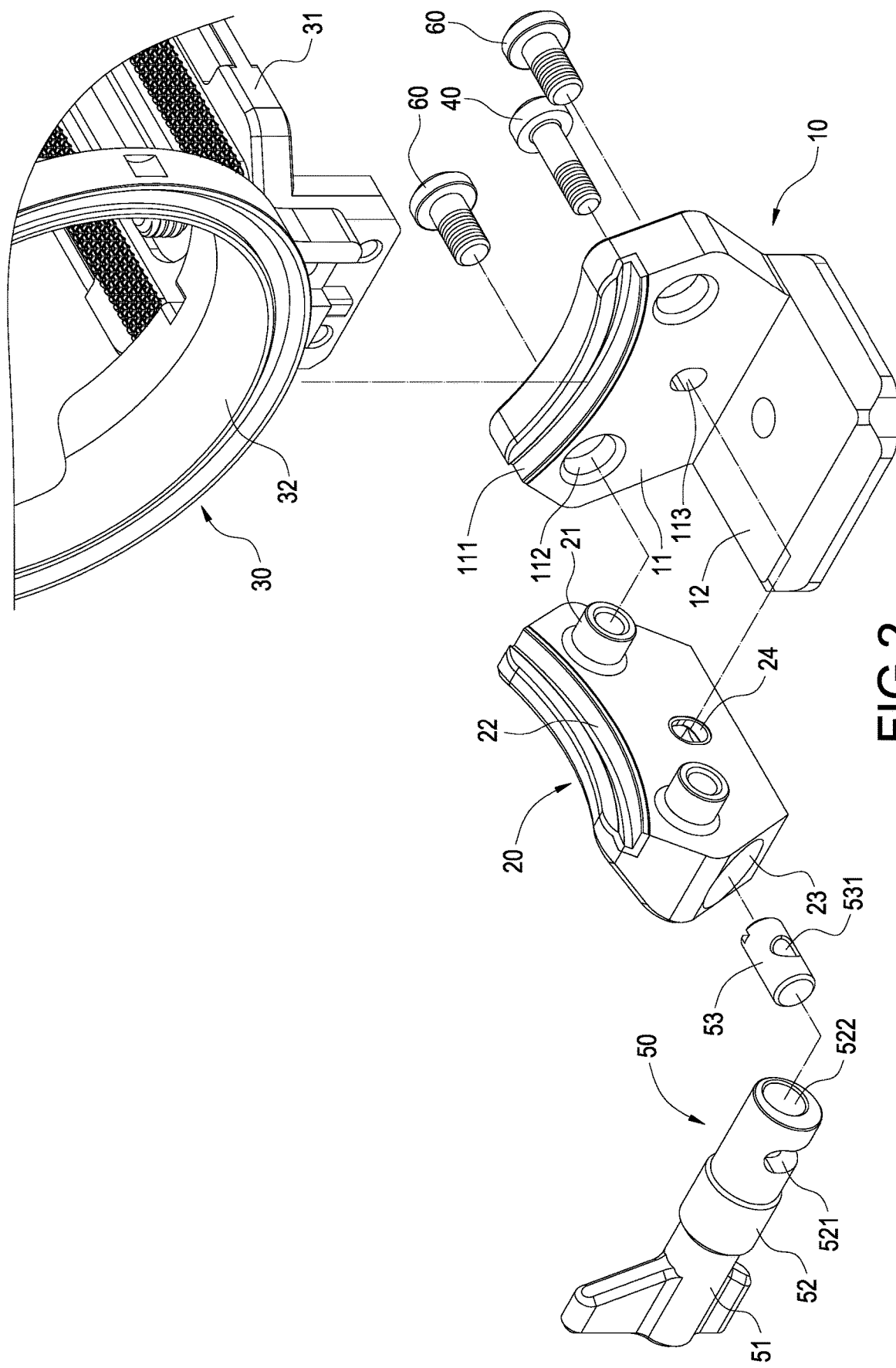
FIG. 2 is an exploded perspective view illustrating the first embodiment of the present disclosure.
Figure 3:
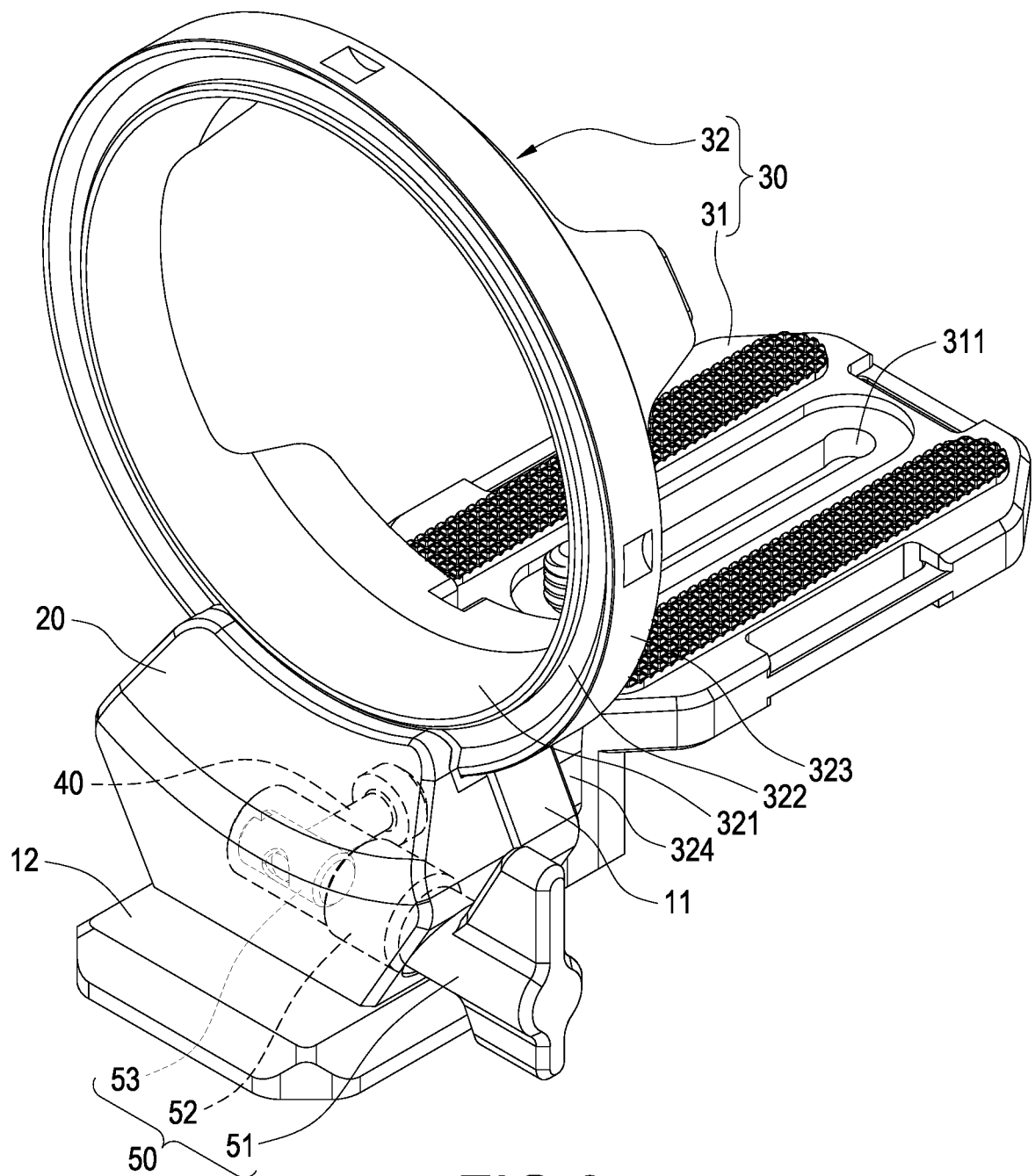
FIG. 3 is a perspective view illustrating the first embodiment of the present disclosure in a locked position.

The present disclosure provides a tripod-head structure (for example, a pan-tilt-zoom structure, abbreviated as a PTZ structure) for holding a photographic device A, and may be fixed on a tripod B. In the present embodiment, the photographic device A is a camera and includes a camera body A1 and a camera lens A2, but the present disclosure is not limited in this regard. Please refer to FIGS. 1, 2, and 3, showing the tripod-head structure according to a first embodiment of the present disclosure. The tripod-head structure mainly includes a fixing bracket 10, a rotating base 30, a tightening element 40, and an adjustment component 50.

The fixing bracket 10 includes a vertically connected first clamping plate 11, an adapter plate 12, and a second clamping plate 20 positioned corresponding to the first clamping plate 11. Specifically, in this embodiment, the adapter plate 12 is horizontally positioned, while the first clamping plate 11 is vertically positioned on one side of the adapter plate 12. The present disclosure is not limited to this configuration. The adapter plate 12 is used to be mounted on the tripod B to secure the tripod-head structure of the present disclosure. In this embodiment, the adapter plate 12 is rectangular in shape, but the present disclosure is not limited in this regard. The shape of the adapter plate 12 may be adjusted accordingly depending on an installation surface of different tripods B. The first clamping plate 11 has a first arc-shaped groove 111 and a plurality of positioning holes 112. Specifically, the first arc-shaped groove 111 is arc-shaped and defined at a top edge of a front side of the first clamping plate 11, while the positioning holes 112 penetrate through two opposite sides of the first clamping plate 11.

The second clamping plate 20 is provided with a plurality of threaded studs 21. Each threaded stud 21 extends from a rear side of the second clamping plate 20 and is inserted into one of the positioning holes 112 from the front side of the first clamping plate 11, thereby providing a positioning effect by the treaded stud 21 and the positioning hole 112. In this embodiment, the tripod-head structure of the present disclosure further includes a plurality of bolts 60. Each bolt 60 passes through one of the positioning holes 112 from a rear side of the first clamping plate 11 to be securely fastened to one of the threaded studs 21, thus preventing detachment of the second clamping plate 20. The present disclosure is not limited to this configuration. The second clamping plate 20 includes a second arc-shaped groove 22. Specifically, the second arc-shaped groove 22 is corresponding to the first arc-shaped groove 111 in arc-shaped. The second arc-shaped groove 22 is defined at a top edge of the rear side of the second clamping plate 20, creating a symmetrical arrangement with the first arc-shaped groove 111.

Figure 4:
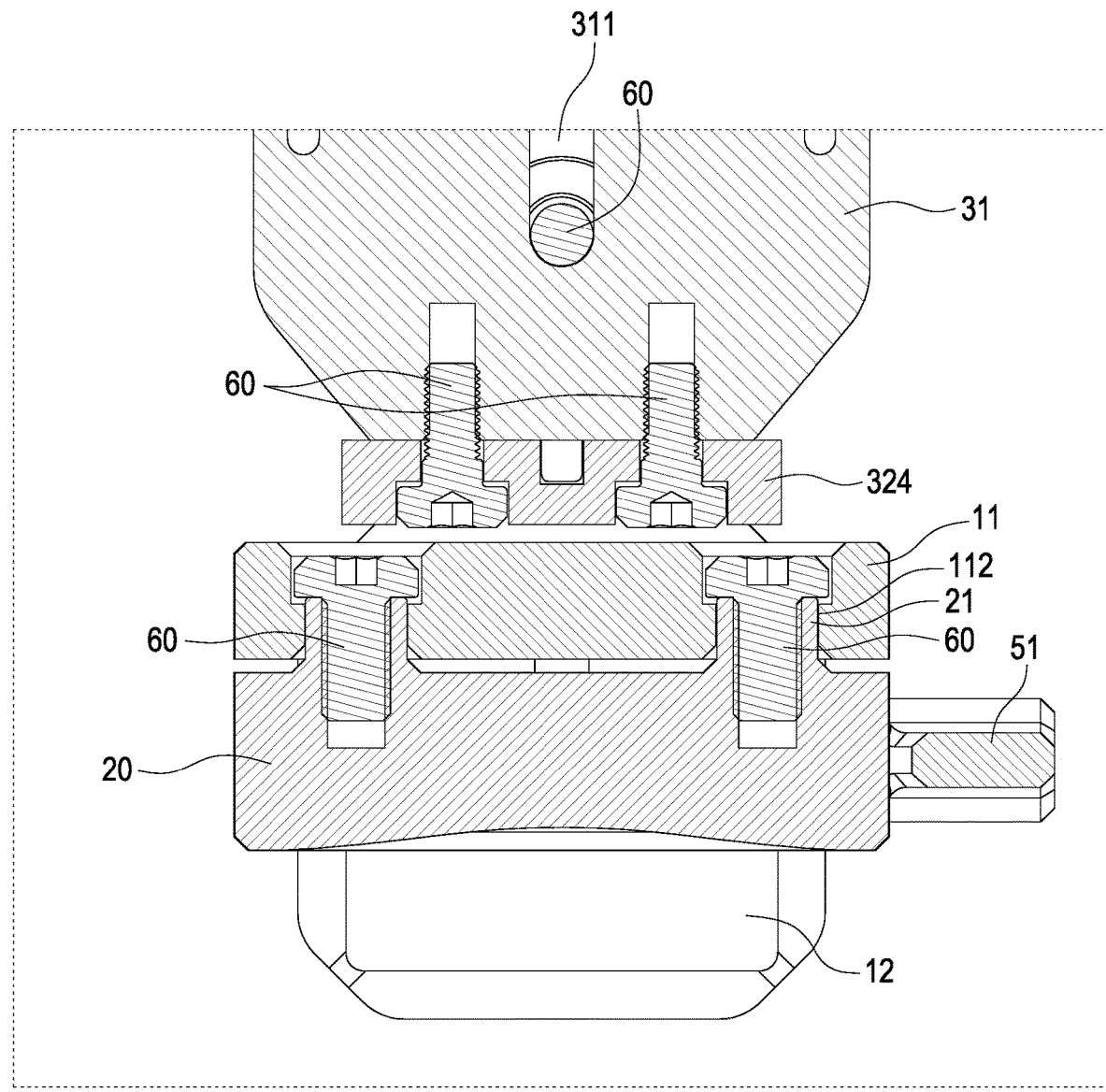
FIG. 4 is a cross-sectional top view illustrating the first embodiment of the present disclosure in the locked position.

The rotating base 30 includes a mounting platform 31 and a slide rail 32. The mounting platform 31 is used for mounting the camera body A1 of the photographic device A. Specifically, an elongated hole 311 vertically penetrates the mounting platform 31 for insertion of the bolt 60 to secure and fasten the photographic device A onto the mounting platform 31. This ensures that the photographic device A is securely attached to the mounting platform 31. The slide rail 32 is vertically connected to a front end of the mounting platform 31, with its sliding track plane perpendicular to the mounting platform 31. Accordingly, the slide rail 32 is used to secure the camera lens A2 of the photographic device A. Referring to FIG. 4, in this embodiment, the bolts 60 pass through a mounting portion 324 of the slide rail 32 to be fastened to a front side of the mounting platform 31, thereby fixing the slide rail 32 to the mounting platform 31. A portion of the slide rail 32 is located between the first arc-shaped groove 111 and the second arc-shaped groove 22, allowing the rotating base 30 to be disposed on the fixing bracket 10.

Figure 10:
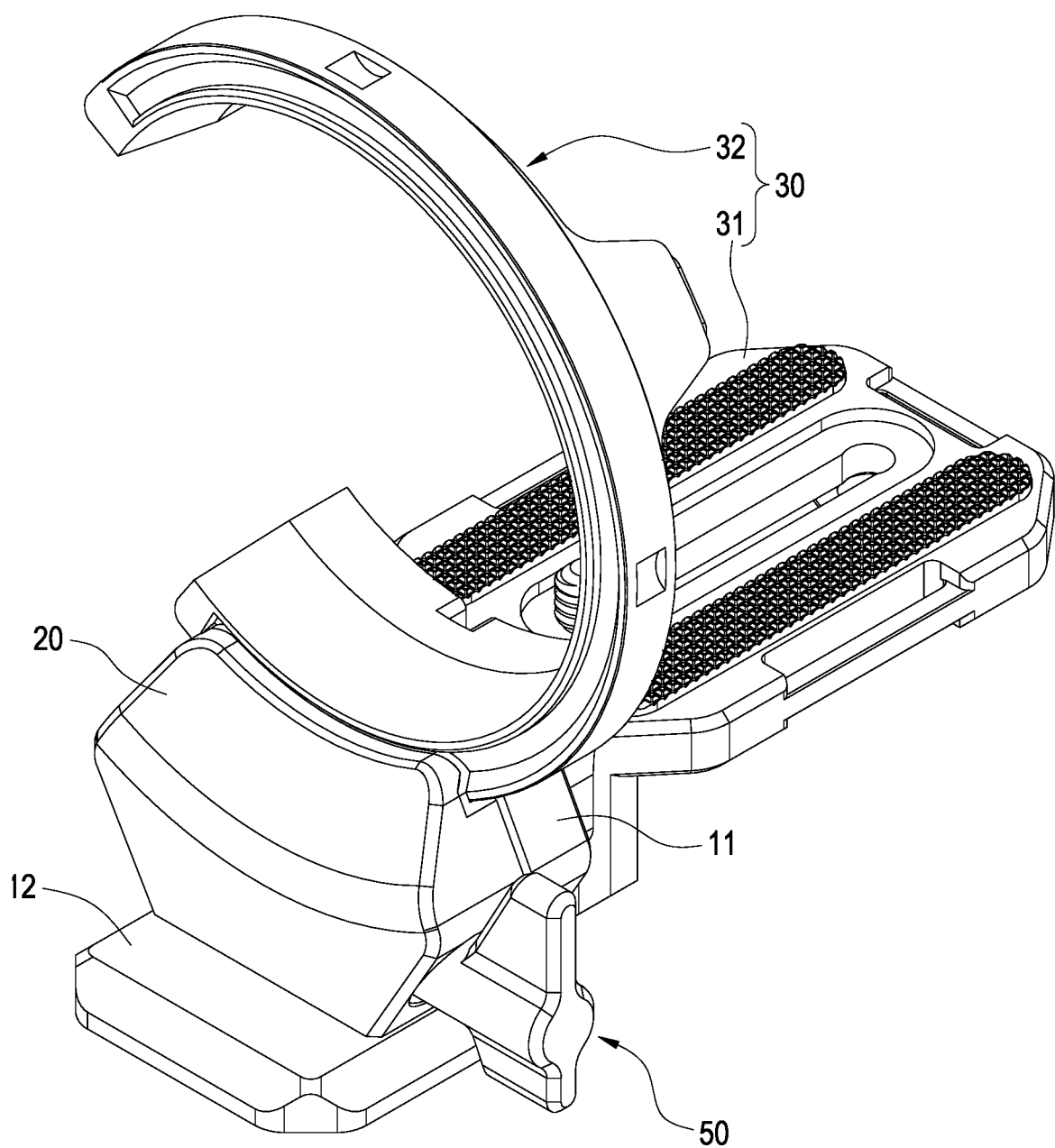
FIG. 10 is a perspective view illustrating a second embodiment of the present disclosure.
Figure 11:
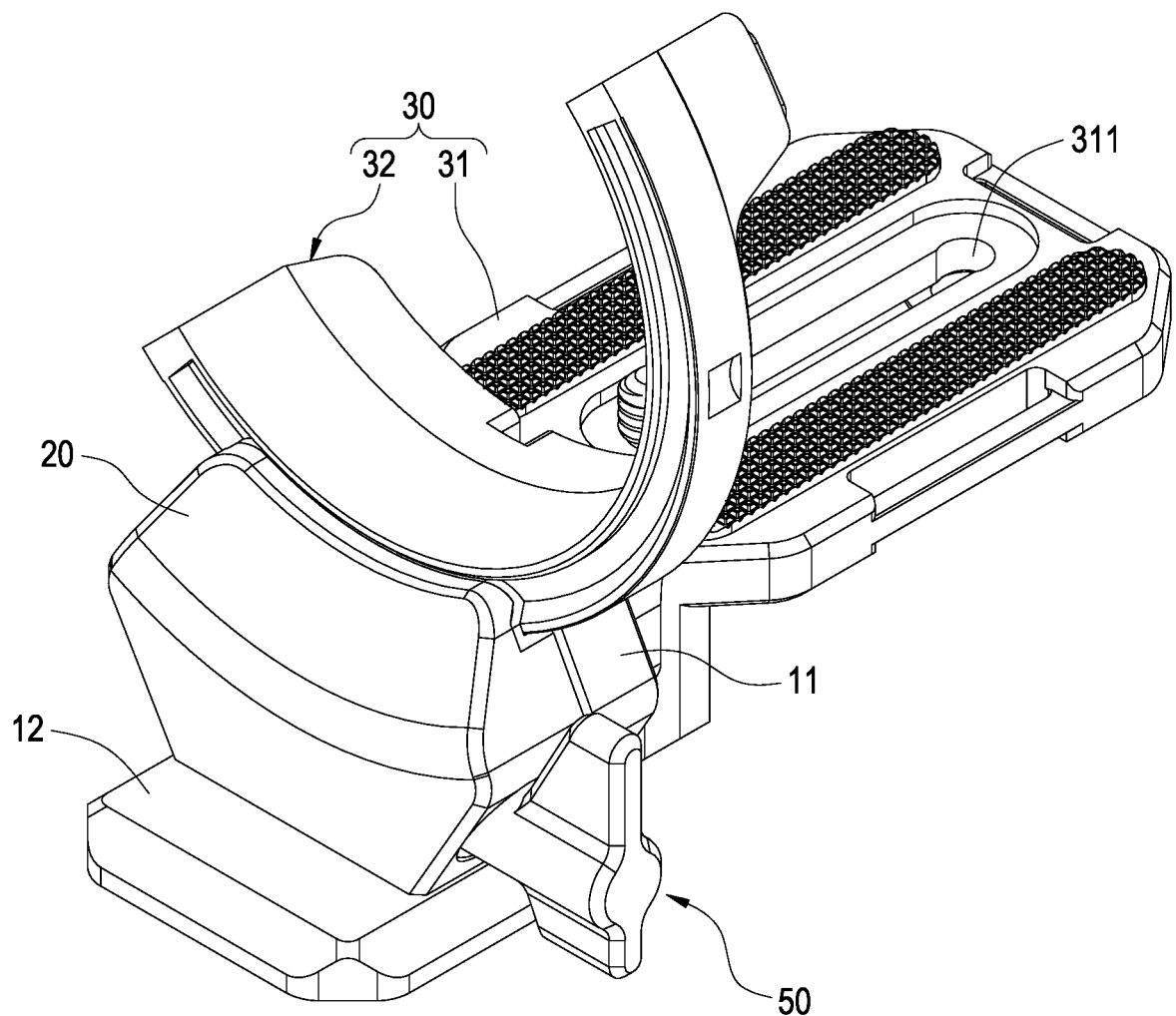
FIG. 11 is a perspective view illustrating a third embodiment of the present disclosure.

In the present embodiment, the slide rail 32 is circular-shaped, but the present disclosure is not limited to this configuration. For example, the slide rail 32 may also be arc-shaped. Please refer to FIG. 10, which illustrates a second embodiment of the present disclosure. A main difference from the first embodiment is that the slide rail 32 is in the form of a three-quarter circular arc. Furthermore, please refer to FIG. 11, which shows a third embodiment of the present disclosure. A main difference from the first embodiment is that the slide rail 32 is in the form of a half-circle arc. This way, shapes of the slide rail 32 may be selected according to the requirements of various rotation angles. It should be noted that the shapes of the slide rail 32 mentioned above are merely illustrative examples and are not intended to limit the shape of the slide rail 32 of the present disclosure. As long as the slide rail 32 is circular or arc-shaped, it should fall within the protection scope of the present disclosure.

The tightening element 40 passes through the first clamping plate 11 and the second clamping plate 20 of the fixing bracket 10. The adjustment component 50 is disposed in the second clamping plate 20 and connected to the tightening element 40. The adjustment component 50 may be switched between an unlocked position and a locked position, so that the tightening element 40 may loosen or tighten the first clamping plate 11 and the second clamping plate 20 of the fixing bracket 10. Accordingly, the slide rail 32 is slidable between the first arc-shaped clamping groove 111 and the second arc-shaped clamping groove 22 or be clamped and fastened between the first arc-shaped clamping groove 111 and the second arc-shaped clamping groove 22, so as to achieve simple and rapid multi-angle rotation adjustment of the rotating base 30.

Figure 5:
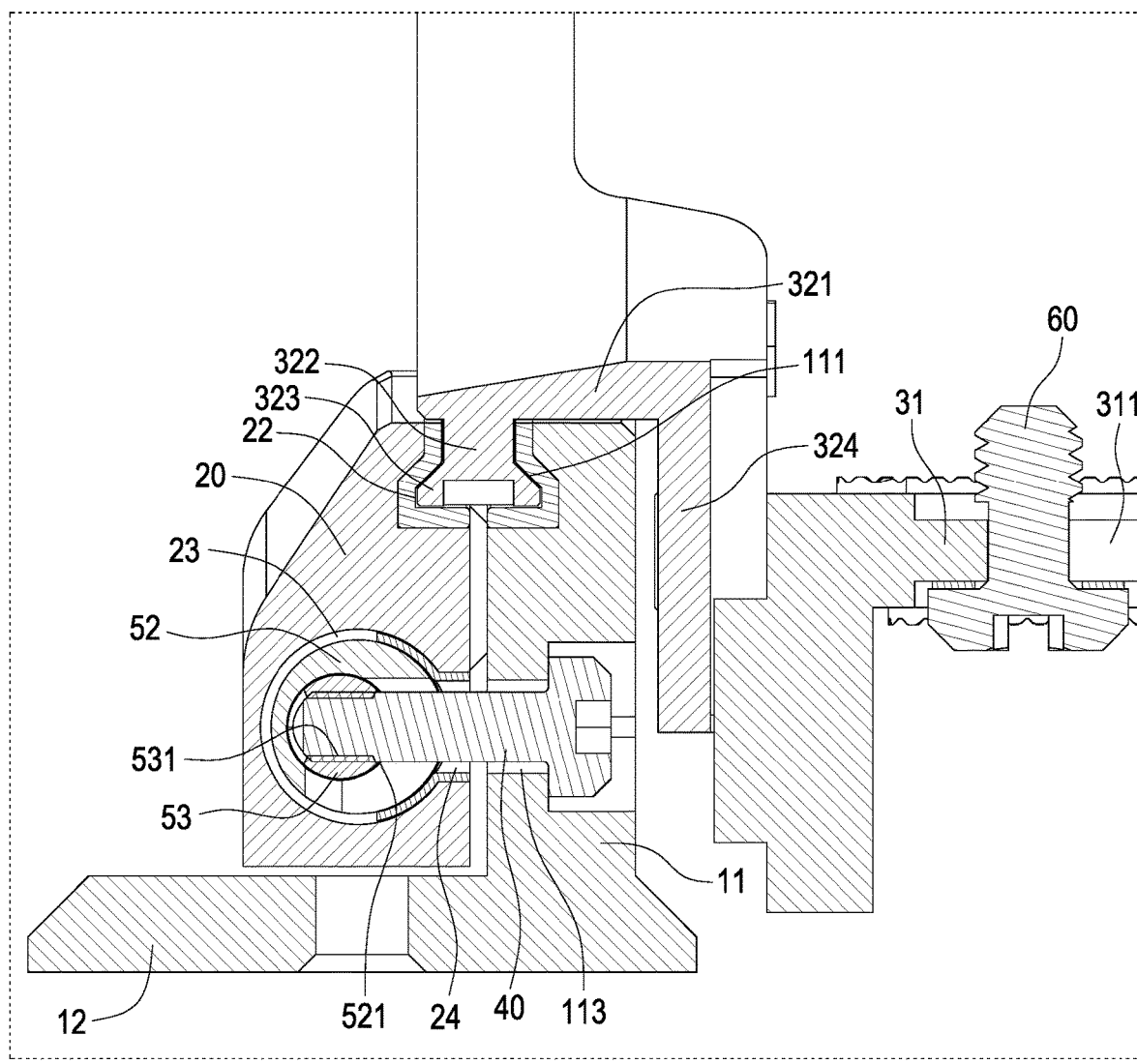
FIG. 5 is a cross-sectional side view illustrating the first embodiment of the present disclosure in the locked position.
Figure 6:
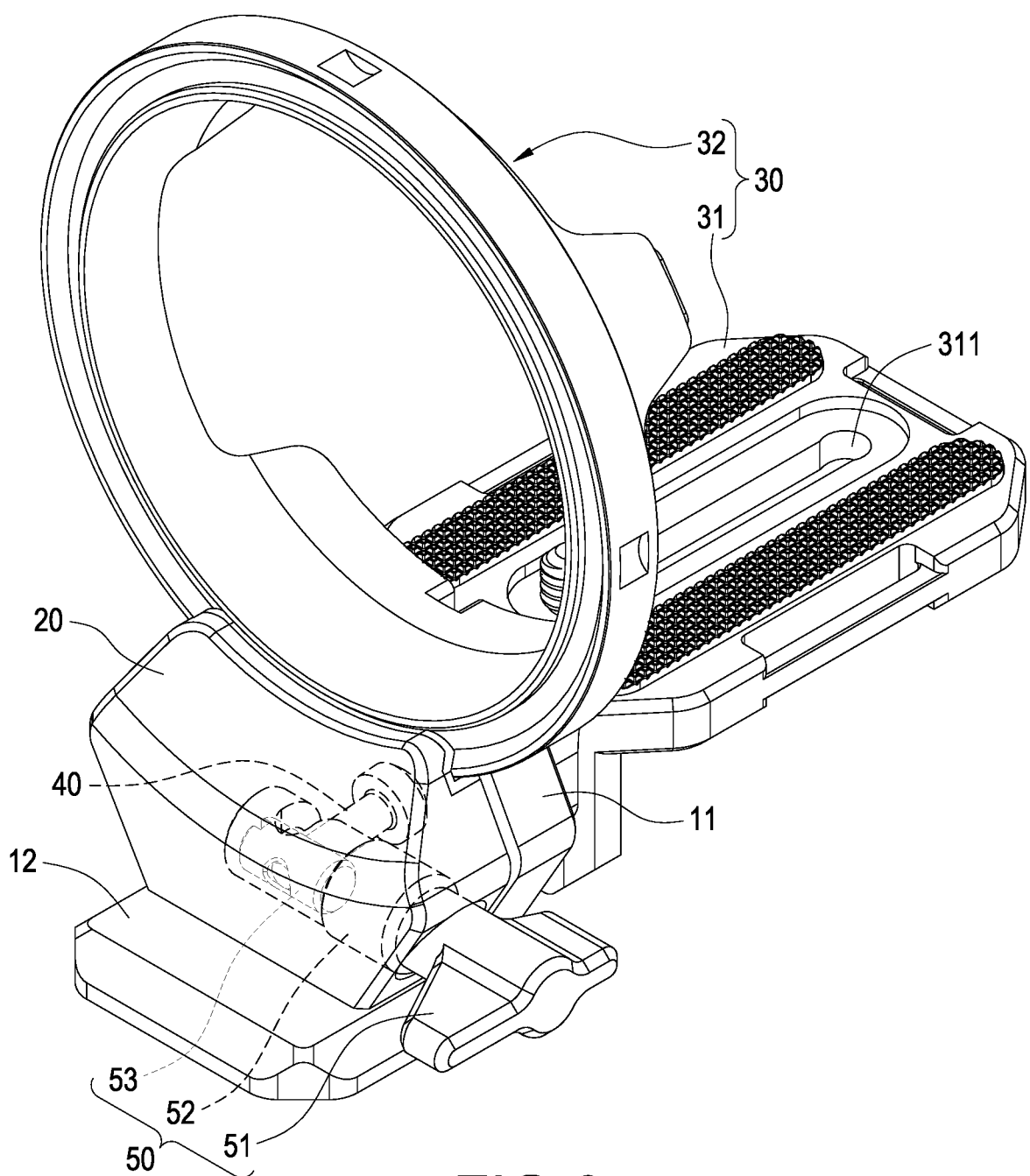
FIG. 6 is a perspective view illustrating an unlocked position according to the first embodiment of the present disclosure.
Figure 7:
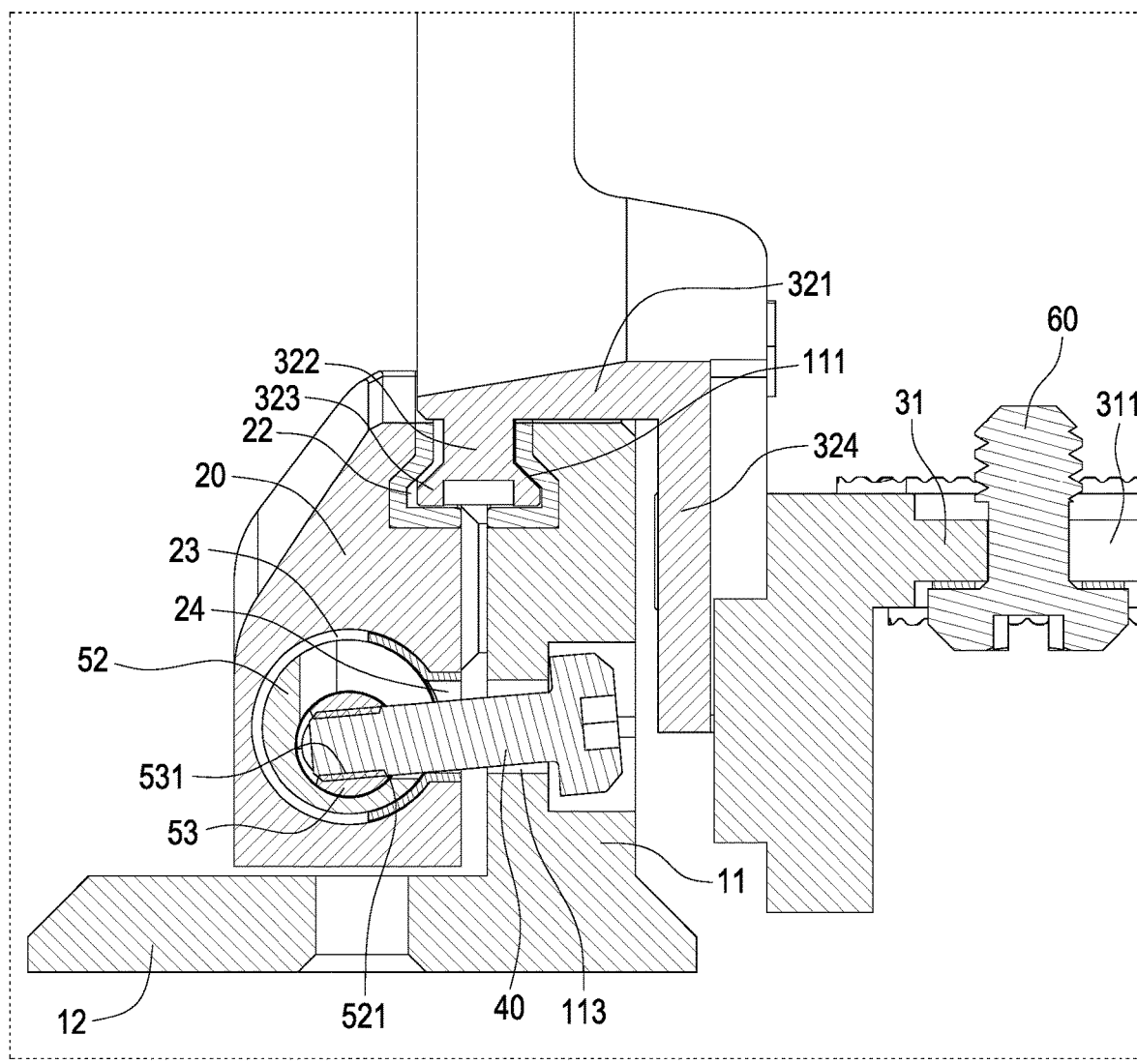
FIG. 7 is a cross-sectional side view illustrating the unlocked position of the first embodiment of the present disclosure.
Figure 8:
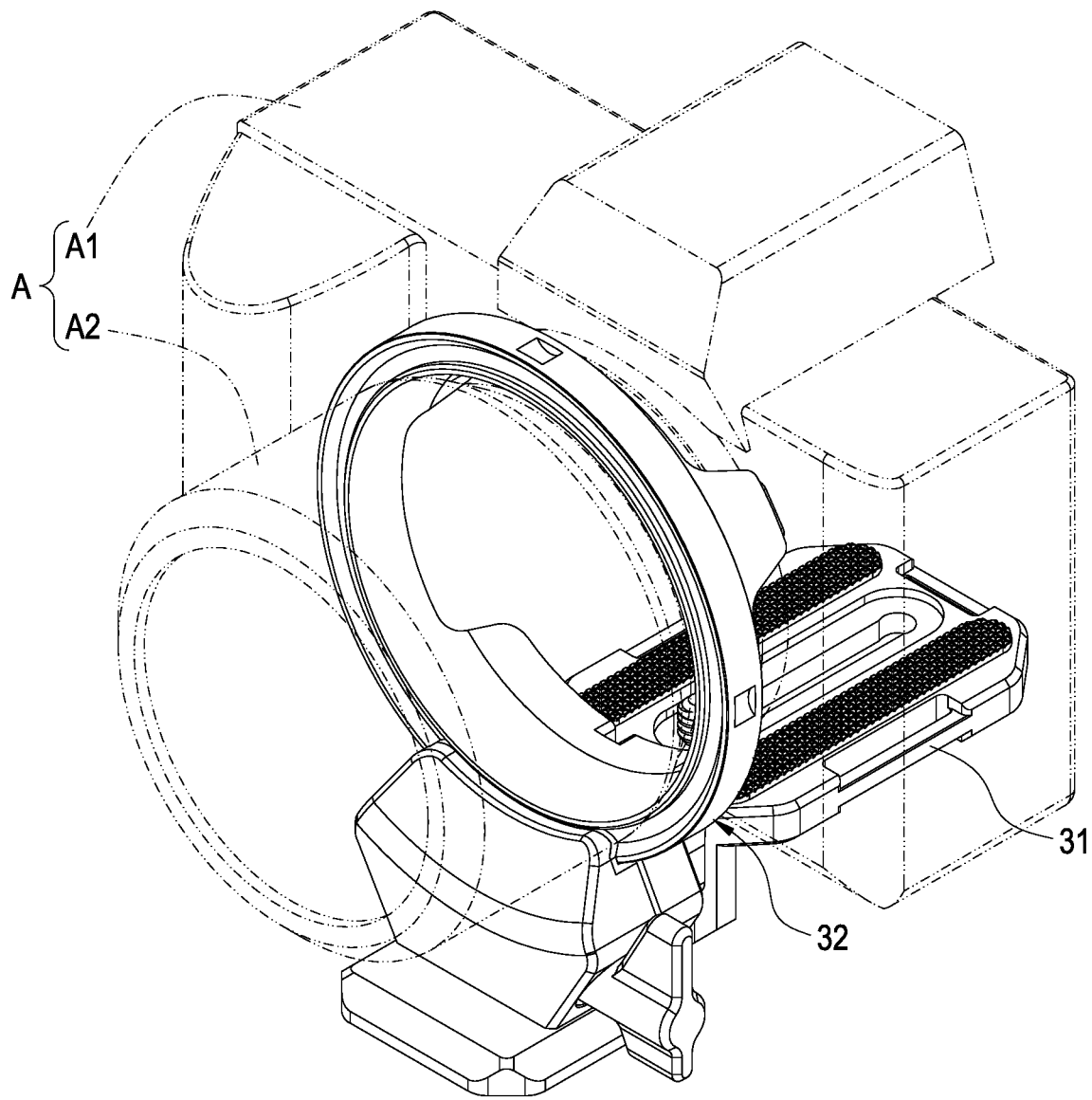
FIG. 8 is a schematic view illustrating a usage state (1) of the first embodiment of the present disclosure.
Figure 9:
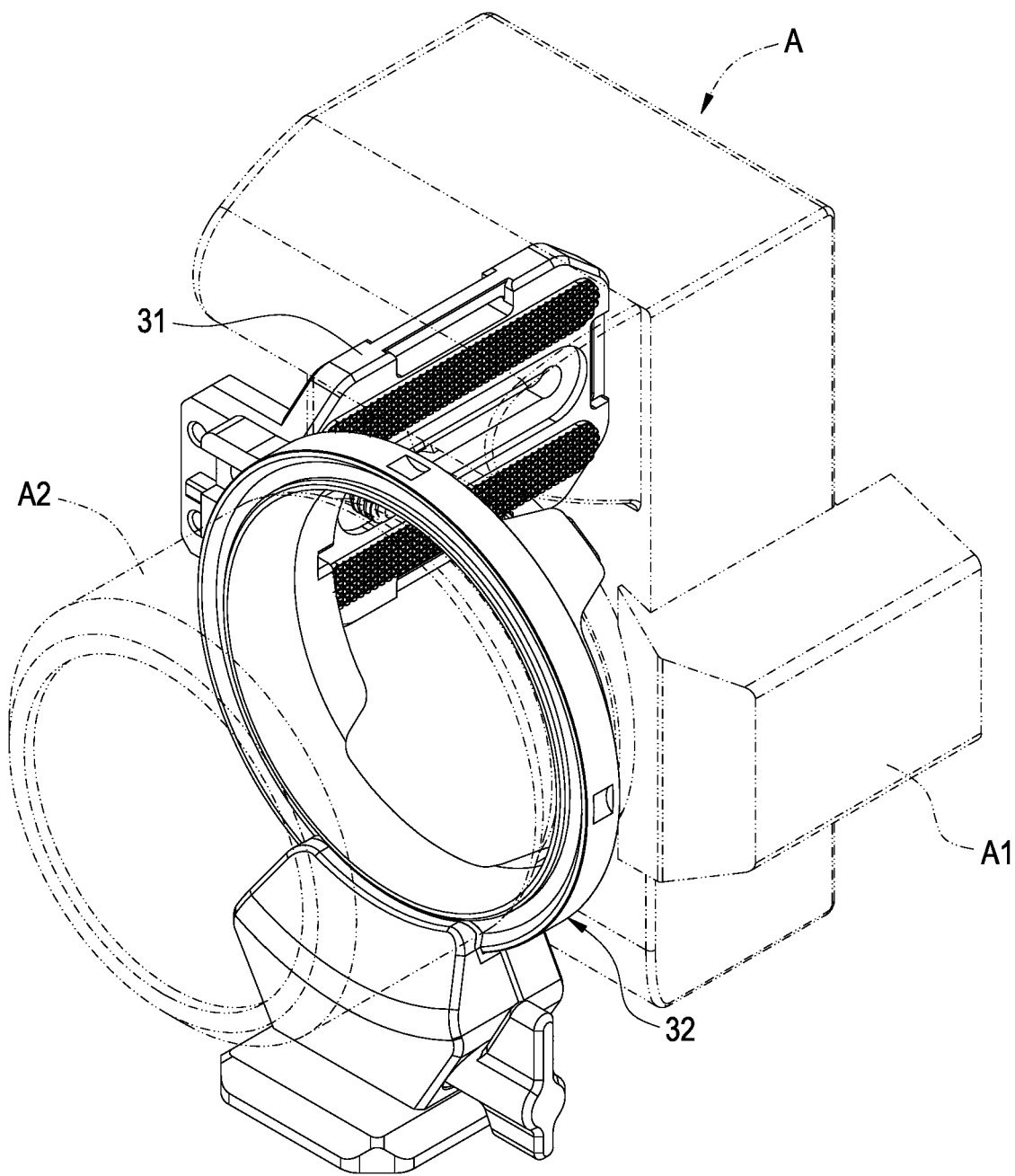
FIG. 9 is a schematic view illustrating a usage state (2) of the first embodiment of the present disclosure.

Specifically, please refer to FIGS. 6 and 7. When the adjustment component 50 is in the unlocked position, the tightening element 40 is loosened to release the pressure on the first clamping plate 11 and the second clamping plate 20. This allows the slide rail 32 to slide within a gap between the first arc-shaped groove 111 and the second arc-shaped groove 22 to adjust an angle of the rotating base 30. Please also refer to FIGS. 3 and 5. When the adjustment component 50 is in the locked position, the tightening element 40 applies pressure to press together the first clamping plate 11 and the second clamping plate 20 of the fixing bracket 10, thereby clamping the slide rail 32 and fixing it between the first arc-shaped groove 111 and the second arc-shaped groove 22, thus securing the rotating base 30. Accordingly, the tripod-head structure of the present disclosure allows quick adjustment of the fixed angle of the rotating base 30 by coordinating the adjustment component 50 and the tightening element 40. This enables the rotating base 30 to rotate and be fixed at a desired angle according to different user needs for photography. Please refer to FIGS. 8 and 9, which depict schematic illustrations of the rotating base 30 before and after approximately 90 degrees of rotation, but the rotation angle of the tripod-head structure of the present disclosure is not limited to the disclosed drawings.

Furthermore, with reference to FIGS. 2, 3, 5, and 7, the slide rail 32 includes a main body 321, a connecting portion 322, a limiting portion 323, and a mounting portion 324. In this embodiment, the main body 321 has a circular ring shape. The connecting portion 322 extends perpendicularly from a portion of an outer edge of the main body 321 and is connected to the limiting portion 323. Specifically, as depicted in FIGS. 5 and 7, the connecting portion 322 has a cross-sectional width less than a cross-sectional width of the main body 321. The limiting portion 323 gradually extends outward from an end of the connecting portion 322, resulting in a trapezoidal cross-sectional shape of the limiting portion 323 in FIGS. 5 and 7. Shapes of the first arc-shaped groove 111 and the second arc-shaped groove 22 fit contours of the connecting portion 322 and the limiting portion 323, allowing both the first arc-shaped groove 111 and the second arc-shaped groove 22 to clamp the slide rail 32 together. The mounting portion 324 extends from a rear side of the main body 321 and forms an inverted L-shape, so as to secure and fix a front end of the mounting base 31.

Referring to FIGS. 2, 3, 4, 5, 6, and 7, in this embodiment, the adjustment component 50 includes a rotary knob 51, a sleeve 52, and a positioning pin 53. The rotary knob 51 is fixedly connected to one end of the sleeve 52. The sleeve 52 includes a notch 521 and a blind hole 522 communicating with each other. Specifically, the blind hole 522 extends inward from an end face of the sleeve 52 at another end and is eccentrically positioned with respect to a center of the sleeve 52. That is to say, a center of the blind hole 522 is at a different location from the center of the sleeve 52. The notch 521 extends inward from a lateral side of the sleeve 52 and communicates with the blind hole 522. The positioning pin 53 is inserted into the blind hole 522 and includes a screw hole 531 on its lateral edge corresponding to the position of the notch 521. Therefore, rotating the rotary knob 51 drives the rotation of the sleeve 52, which in turn rotates the positioning pin 53 inside the sleeve 52.

Furthermore, the first clamping plate 11 includes a first through slot 113, and the second clamping plate 20 includes a containing channel 23 and a second through slot 24. Specifically, the first through slot 113 is an elongated opening transversely penetrating through the first clamping plate 11 and extends along a perpendicular direction. The containing channel 23 extends inward from a side wall of the second clamping plate 20. The second through slot 24 extends inward from the rear side of the second clamping plate 20. The second through slot 24 communicates with the containing channel 23 and is arranged corresponding to the first through slot 113, and accordingly the second through slot 24 is also an elongated opening. The sleeve 52 is rotatably inserted in the containing channel 23, and the rotary knob 51 is exposed from the second clamping plate 20. In the present embodiment, the tightening element 40 is a shoulder bolt. The tightening element 40 sequentially passes through the first through slot 113, the second through slot 24, and the notch 521 from the rear side of the first clamping plate 11 and is threadedly fastened to the screw hole 531 of the positioning pin 53.

Therefore, referring to FIGS. 3 and 5, when the adjustment component 50 is in the locked position, the positioning pin 53 is aligned with the first through slot 113 and the second through slot 24 on the same horizontal line. As a result, the tightening element 40 remains in a horizontal state to press the second clamping plate 20 toward the first clamping plate 11, thereby clamping and securing the slide rail 32 between the first arc-shaped groove 111 and the second arc-shaped groove 22. Referring to FIGS. 6 and 7, when the rotary knob 51 is rotated counterclockwise by 90 degrees to place the adjustment component 50 in the unlocked position, the positioning pin 53, being eccentrically positioned with respect to the sleeve 52, moves below the first through slot 113 and the second through slot 24. This causes the tightening element 40 to rotate counterclockwise and tilt upward along the elongated first through slot 113 and the elongated second through slot 24, thereby releasing the clamping force on the second clamping plate 20 and the first clamping plate 11. Consequently, the slide rail 32 may slide within the gap between the first arc-shaped groove 111 and the second arc-shaped groove 22, thus allowing for the adjustment of the angle of the rotating base 30.

Please refer to FIGS. 12, 13, 14, 15, 16, and 17, which depict the fourth embodiment of the present disclosure. A main difference between this embodiment and the first embodiment lies in the configuration of the adjustment component 50. Specifically, in this embodiment, the adjustment component 50 includes a lever 54 and a positioning pin 53. The lever 54 includes a rotating portion 541 in a cylindrical shape. The rotating portion 541 has a notch 541A and a through hole 541B. More specifically, the through hole 541B extends through two end faces of the rotating portion 541 and is eccentrically positioned with respect to the rotating portion 541. In other words, a center of the through hole 541B is located at a different position from a center of the rotating portion 541, while the notch 541A extends inward from a lateral side of the rotating portion 541 and communicates with the through hole 541B. The positioning pin 53 is inserted into the through hole 541B, and a lateral side of the positioning pin 53 includes a screw hole 531 arranged corresponding to a position of the notch 541A. Therefore, when the lever 54 is operated, it may drive the rotating portion 541 to rotate, thereby causing the positioning pin 53 inside the rotating portion 541 to rotate as well.

In the present embodiment, the first clamping plate 11 includes a first through slot 113, and the second clamping plate 20 has a containing channel 23 and a second through slot 24. Specifically, in this embodiment, the first through slot 113 is an elongated opening transversely penetrating through the first clamping plate 11 and extends widthwise. The containing channel 23 extends inward from a front side of the second clamping plate 20. The second through slot 24 extends inward from the rear side of the second clamping plate 20. The second through slot 24 communicates with the containing channel 23 and is arranged corresponding to the first through slot 113, and accordingly the second through slot is also an elongated opening. The rotating portion 541 is rotatably disposed in the containing channel 23, and the lever 54 is exposed from the second clamping plate 20. In the present embodiment, the tightening element 40 is a shoulder bolt. The tightening element 40 passes successively through the first through slot 113, the second through slot 24, and the notch 541A from the rear side of the first clamping plate 11, and is threadedly fastened to the screw hole 531 of the positioning pin 53.

Figure 12:
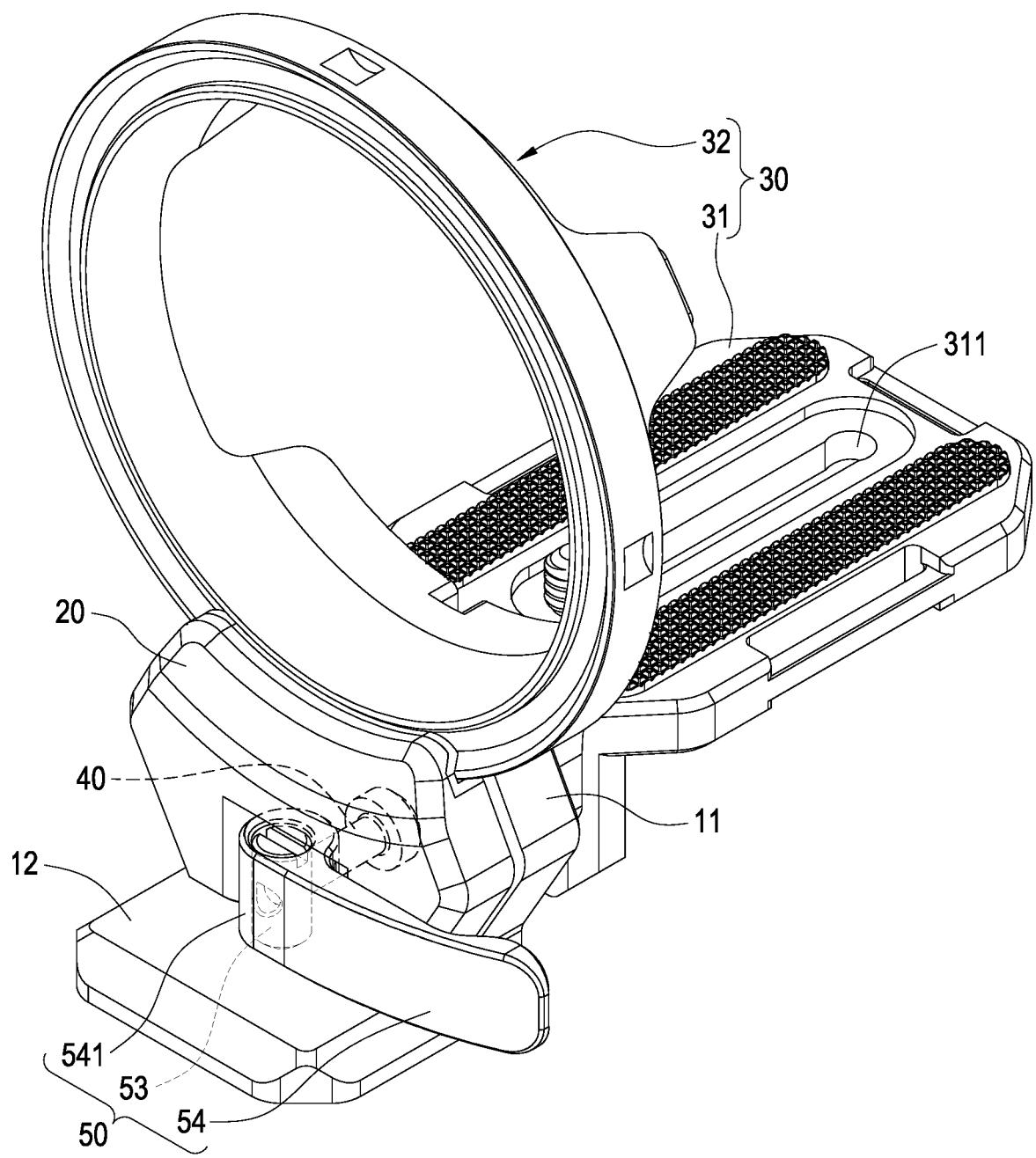
FIG. 12 is a perspective view illustrating the locked position according to a fourth embodiment of the present disclosure.
Figure 13:
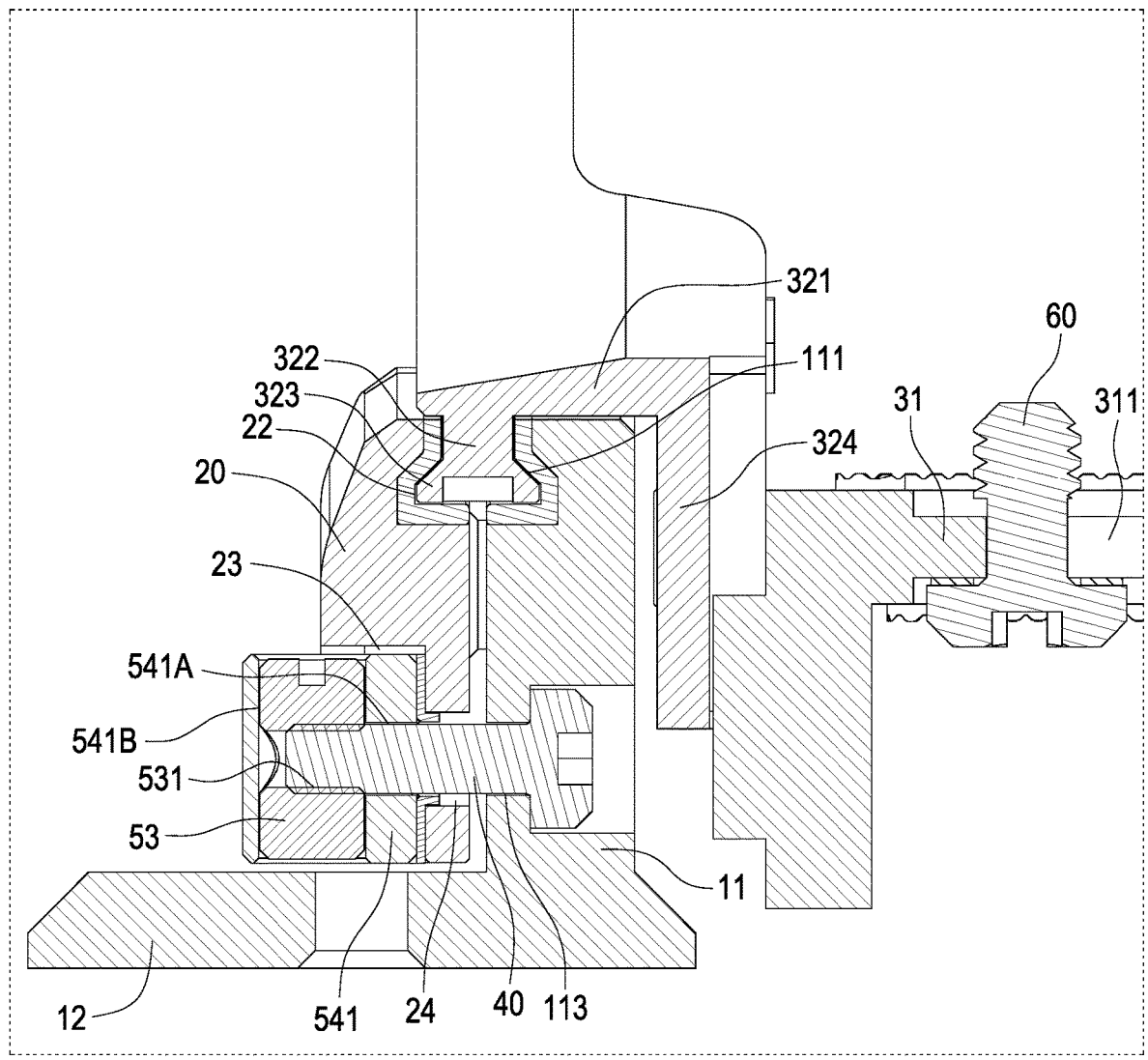
FIG. 13 is a cross-sectional side view illustrating the locked position of the fourth embodiment of the present disclosure.
Figure 14:
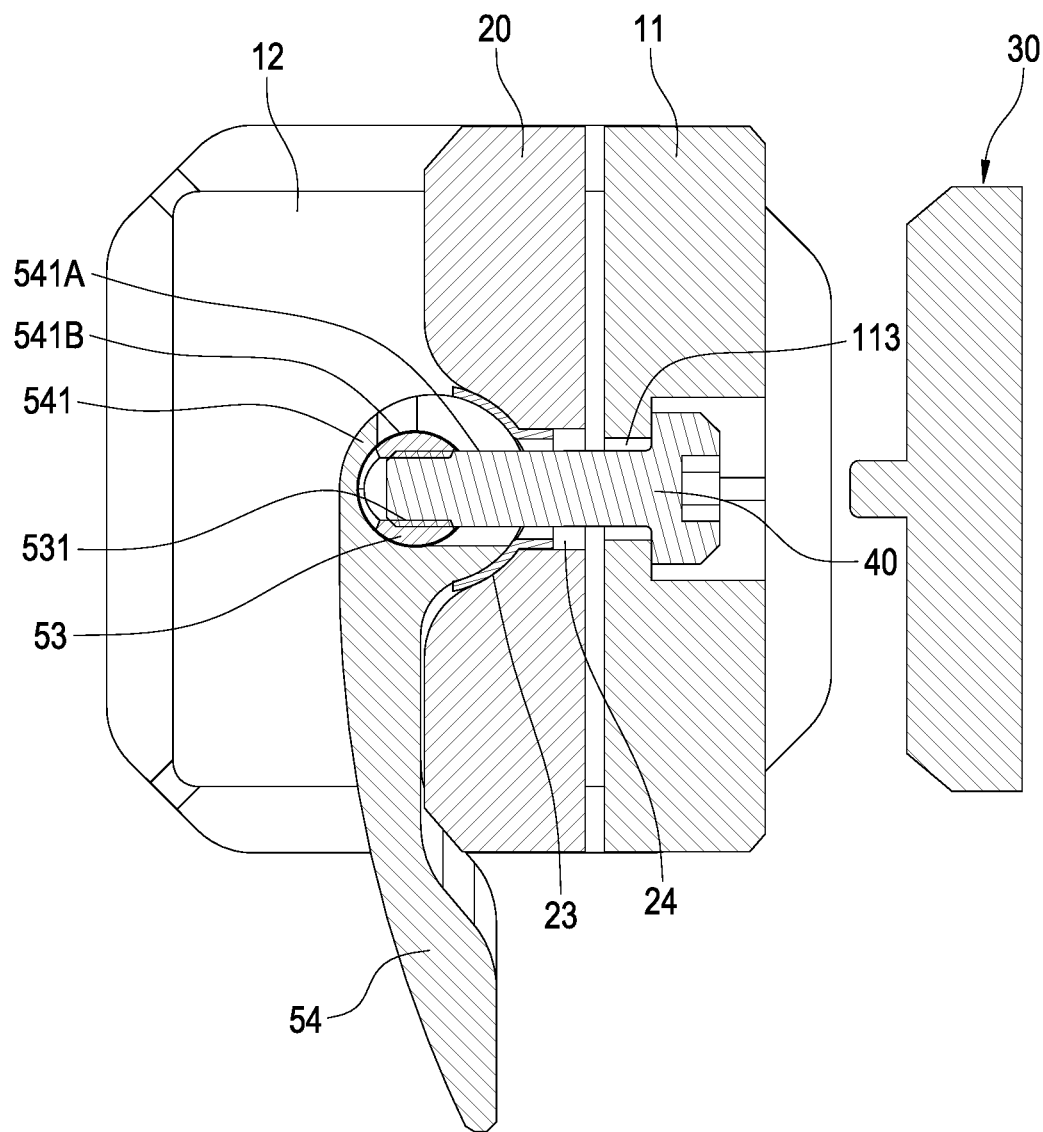
FIG. 14 is a cross-sectional top view illustrating the locked position of the fourth embodiment of the present disclosure.
Figure 15:
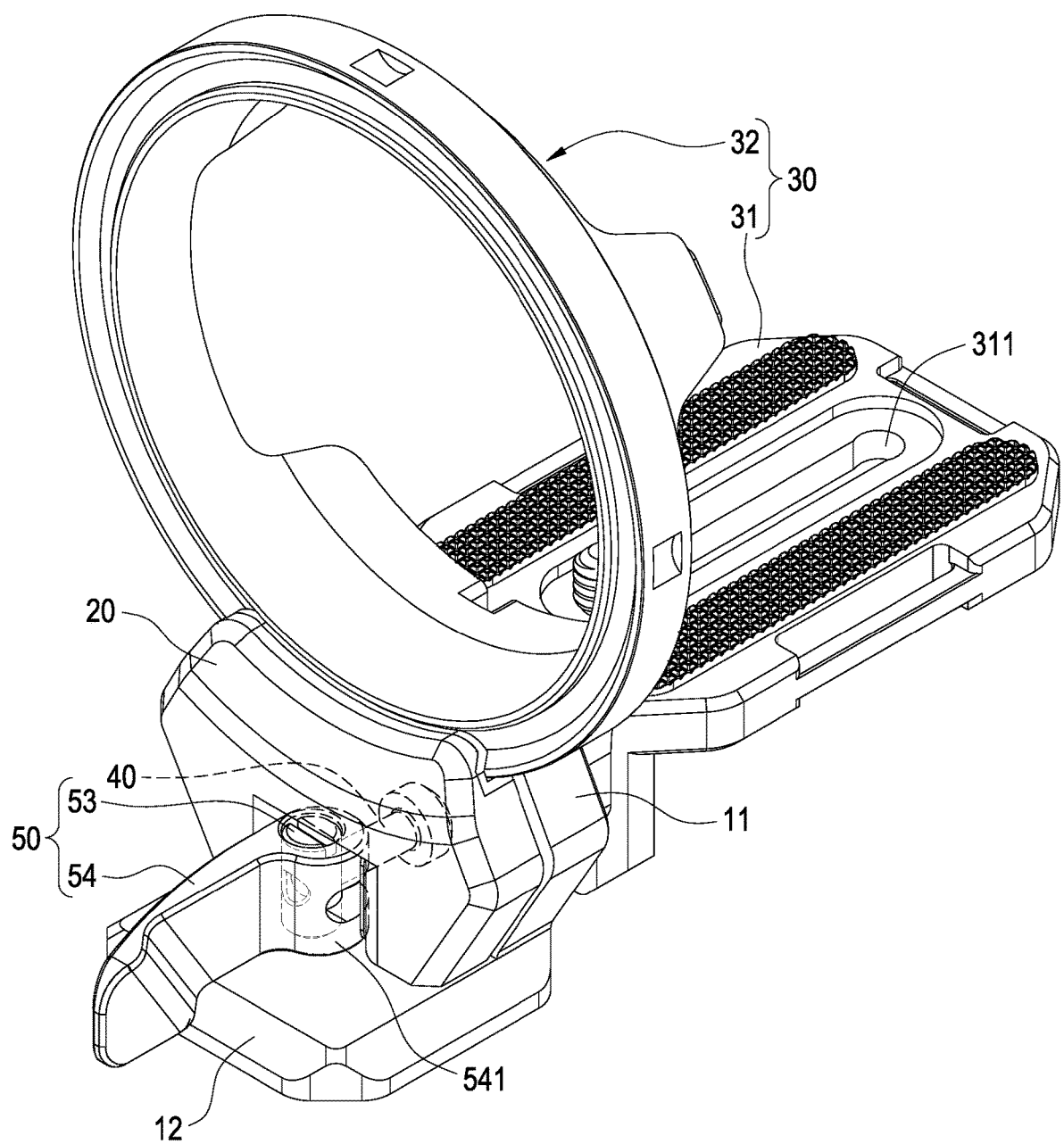
FIG. 15 is a perspective view of the unlocked position of the fourth embodiment of the present disclosure.
Figure 16:
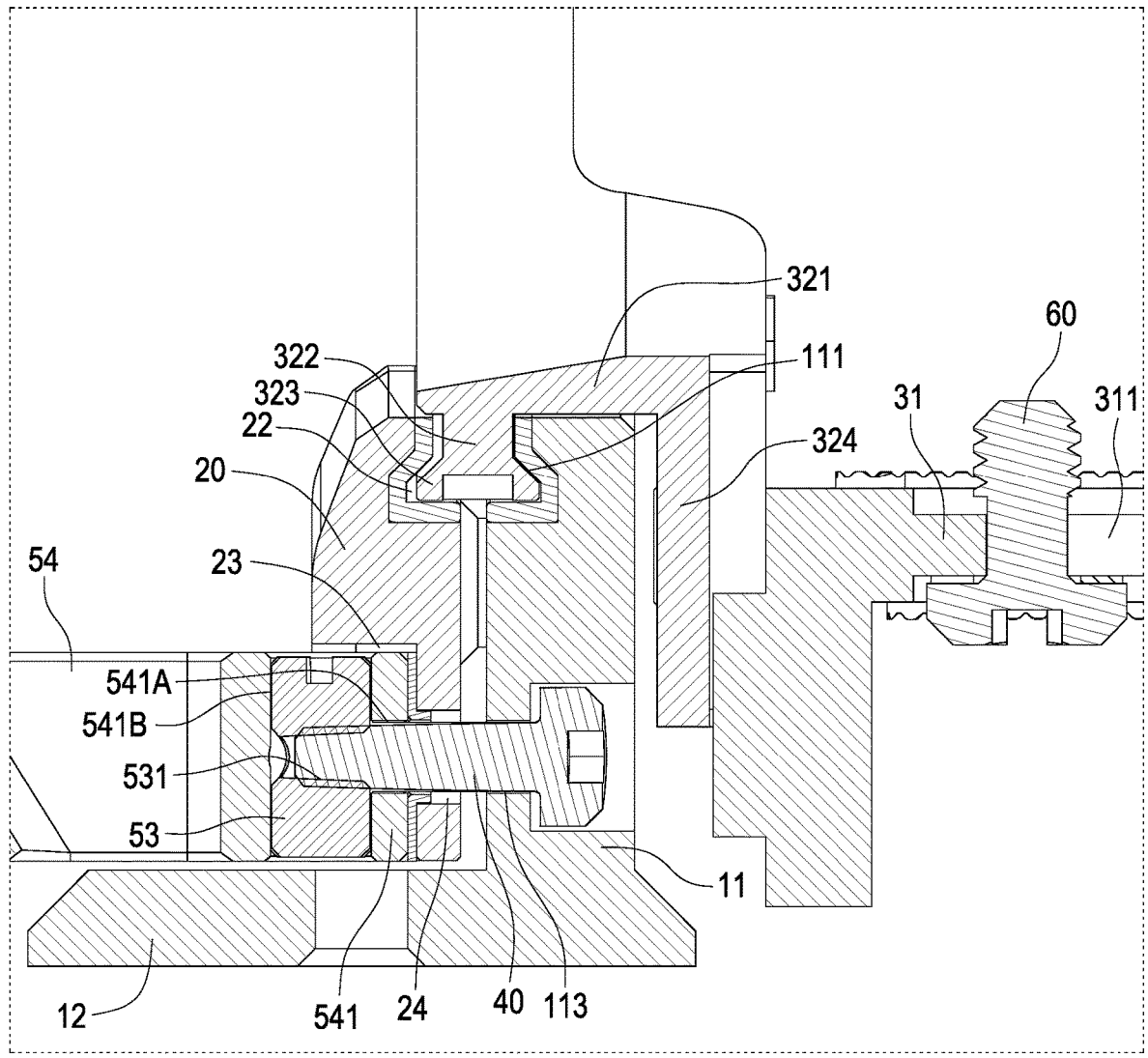
FIG. 16 is a sectional side view of the unlocked position of the fourth embodiment of the present disclosure.
Figure 17:
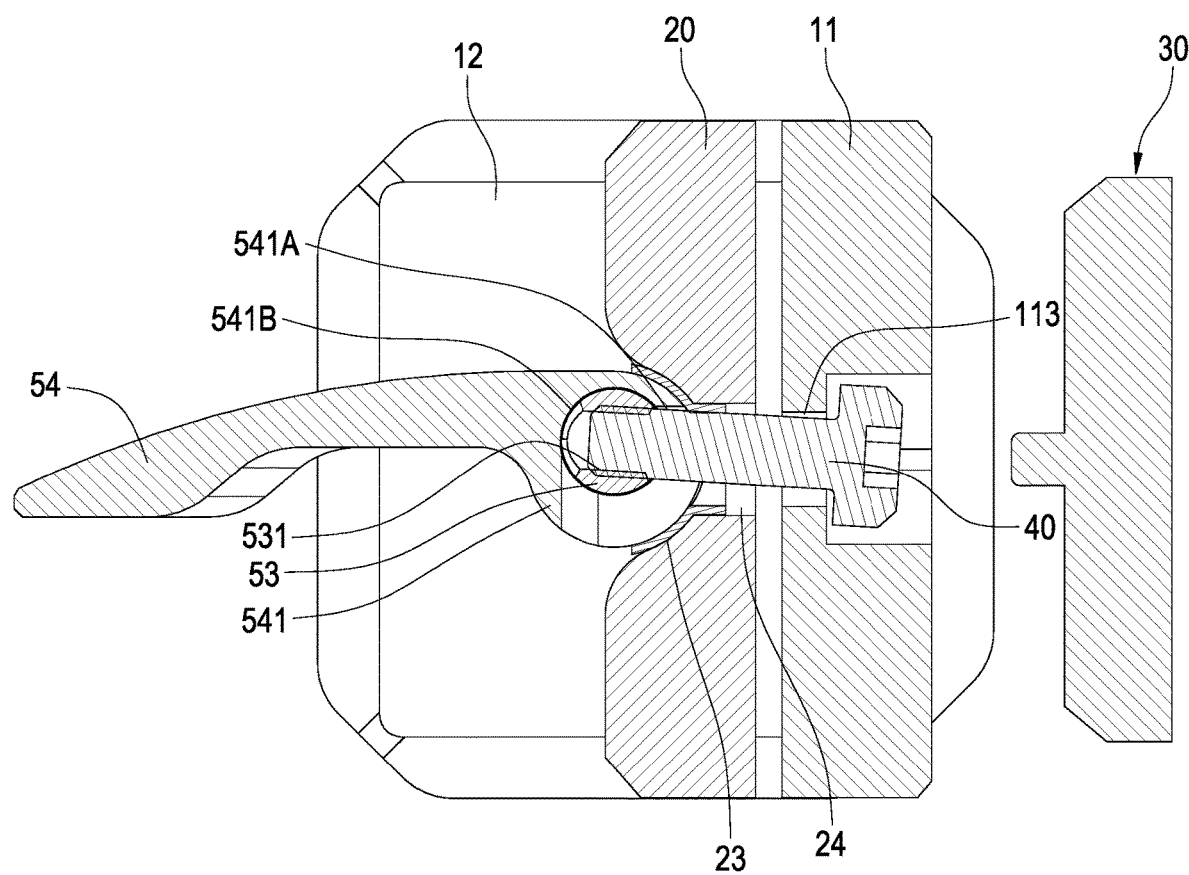
FIG. 17 is a cross-sectional top view of the unlocked position of the fourth embodiment of the present disclosure.

Thus, referring to FIGS. 12, 13, and 14, when the adjustment component 50 is in the locked position, the lever 54 is flatly attached to the front side of the first clamping plate 11. The positioning pin 53 is aligned with the first through slot 113 and the second through slot 24 on the same horizontal line. As a result, the tightening element 40 remains in a horizontal state, pressing the second clamping plate 20 toward the first clamping plate 11, thereby securely clamping the slide rail 32 between the first arc-shaped groove 111 and the second arc-shaped groove 22. Referring to FIGS. 15, 16, and 17, when the lever 54 is pulled forward by 90 degrees to place the adjustment component 50 in the unlocked position, due to the eccentric arrangement of the positioning pin 53 and the rotating portion 541, the positioning pin 53 is driven by the rotating portion 541 to rotate and laterally deviate toward the first through slot 113 and the second through slot 24. Consequently, the tightening element 40, following the rotation of the positioning pin 53, undergoes a lateral deviation along the elongated opening of the first through slot 113 and the elongated opening of the second through slot 24. This releases the pressure on the second clamping plate 20 and the first clamping plate 11, enables the slide rail 32 to slide within the gap between the first arc-shaped groove 111 and the second arc-shaped groove 22, thereby allowing for adjustment of the angle of the rotating base 30.

Please continue to refer to FIGS. 18, 19, 20, and 21, which depict a fifth embodiment of the present disclosure. A main difference between this embodiment and the first embodiment lies in the configuration of the adjustment component 50. Specifically, the adjustment component 50 in this embodiment includes a rotating handle 55, a fastening element 56, a blocking plate 57, and a compression spring 58. The rotating handle 55 includes a rotating bar 551 and a rotating portion 552 in a cylindrical shape. Two end faces of the rotating portion 552 are respectively provided with a blind hole 552A and a recess 552B arranged correspondingly and communicating with each other. To be more specific, the blind hole 552A extends inward from a rear end face of the rotating portion 552, while the recess 552B extends inward from a front end face of the rotating portion 552. The blind hole 552A and the recess 552B communicates with each other through a through opening 552C located between them. The rotating bar 551 is positioned on the front end face of the rotating portion 552, thereby covering the recess 552B.

Figure 19:
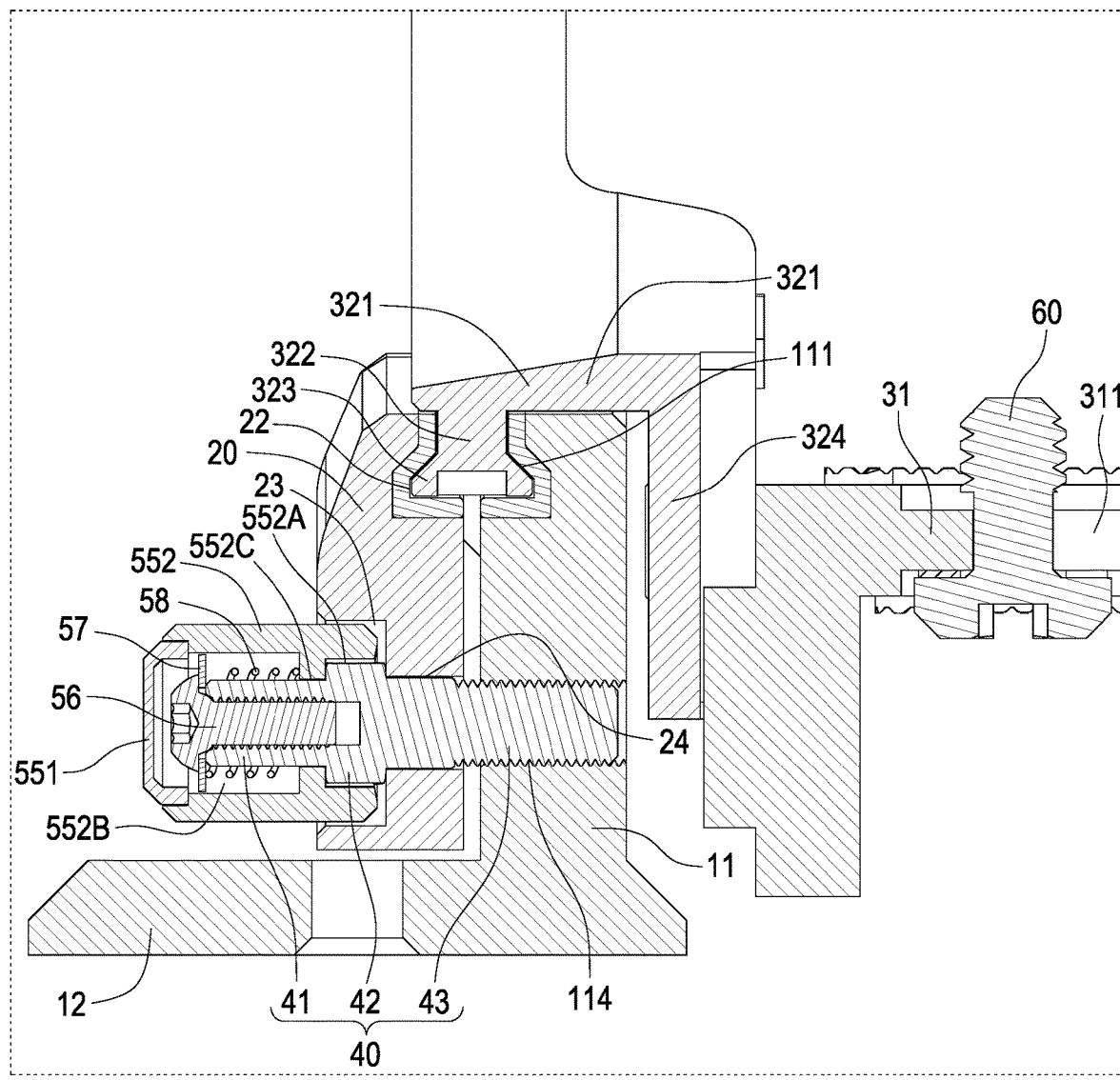
FIG. 19 is a cross-sectional side view illustrating the locked position of the fifth embodiment of the present disclosure.
Figure 20:
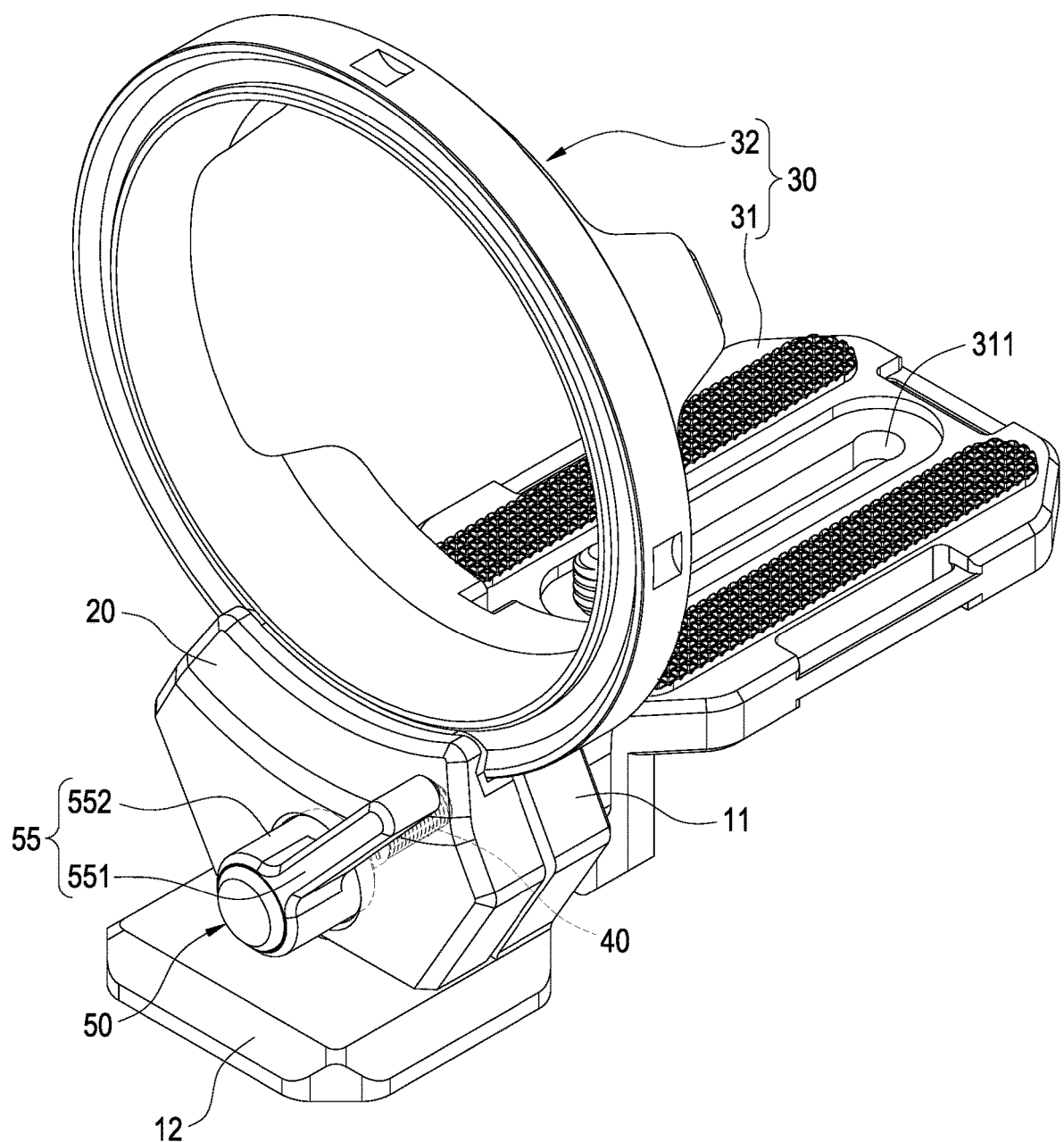
FIG. 20 is a perspective view illustrating the unlocked position of the fifth embodiment of the present disclosure.
Figure 21:
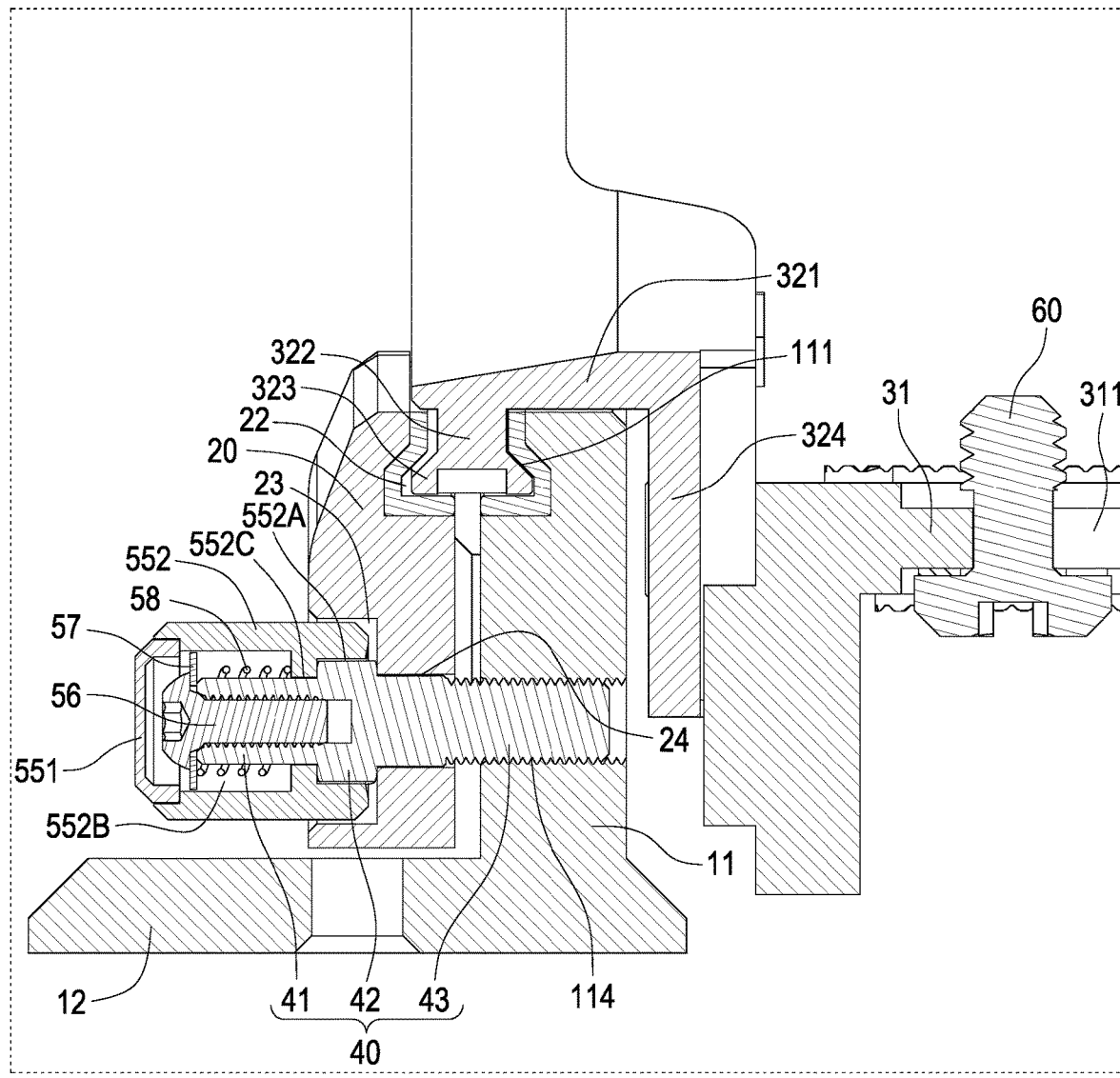
FIG. 21 is a cross-sectional side view illustrating the unlocked position of the fifth embodiment of the present disclosure.

In the present embodiment, the first clamping plate 11 includes a fastening hole 114, and the second clamping plate 20 has a containing channel 23 and a second through slot 24. Specifically, the fastening hole 114 in this embodiment is a threaded hole that transversely penetrates through the first clamping plate 11. The containing channel 23 extends inward from the front side of the second clamping plate 20, while the second through slot 24 extends inward from the rear side of the second clamping plate 20 and communicates with the containing channel 23. The second through slot 24 corresponds the position and size of the fastening hole 114 and forms a circular hole. A diameter of the second through slot 24 is less than a diameter of the containing channel 23, as shown in FIGS. 19 and 21. The rotating portion 552 is partially arranged inside the containing channel 23 and is rotatable, and the rotating handle 55 is exposed from the second clamping plate 20.

In the present embodiment, the tightening element 40 is in the form of a rod and includes an insertion section 41, a contact section 42, and a threaded section 43 connected sequentially. A diameter of the contact section 42 is greater than a diameter of the insertion section 41 or the threaded section 43. Two end faces of the contact section 42 abut against a bottom of the blind hole 552A and a bottom of the containing channel 23, respectively, to make the insertion section 41 be inserted through and engaged with the through opening 552C to be accommodated within the recess 552B. Therefore, in rotating the rotating handle 55, the rotating bar 551 may be used to drive the rotating portion 552 to rotate, thereby rotating the tightening element 40 secured within the rotating portion 552 as well. The fastening element 56 is used to secure the blocking plate 57 to the insertion section 41. The compression spring 58 sheathes an outer periphery of the insertion section 41 and is compressed between and elastically abuts against the bottom of the recess 552B and the blocking plate 57. In this embodiment, the fastening element 56 is a screw, the blocking plate 57 is a washer, and the insertion section 41 is a screw rod. The screw passes through the washer to be fastened to the screw rod. The present disclosure is not limited to this configuration. For example, the fastening element 56 may also be a rivet, and the insertion section 41 may be a hollow cylinder. Accordingly, the insertion section 41, fastening element 56, the blocking plate 57, and the compression spring 58 are all accommodated within the recess 552B of the rotating portion 552. The threaded section 43 passes through the second through slot 24 to be threaded connected to the fastening hole 114. It should be noted that the threaded section 43 only has external threads in a portion that screws into the fastening hole 114, while a portion of the threaded section 43 inserted in the second through slot 24 does not have external threads.

Figure 18:
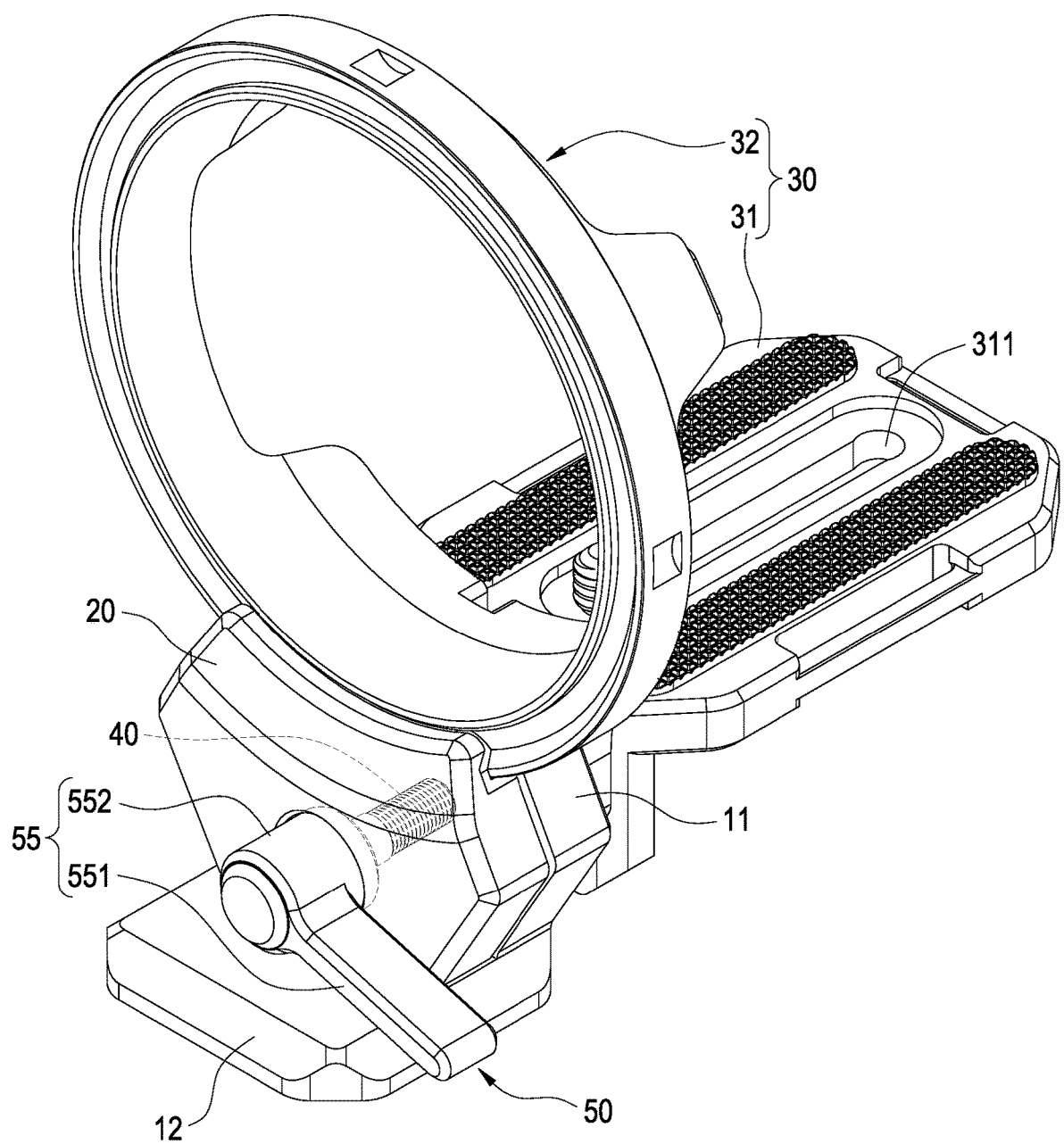
FIG. 18 is a perspective view illustrating the locked position according to a fifth embodiment of the present disclosure.

Referring to FIGS. 18 and 19, when the adjustment component 50 is in the locked position, the contact section 42 abuts against the bottom of the containing channel 23. Accordingly, through the fastening hole 114, the threaded section 43 of the tightening element 40 presses the second clamping plate 20 toward the first clamping plate 11. This action securely clamps the slide rail 32 between the first arc-shaped groove 111 and the second arc-shaped groove 22. Furthermore, referring to FIGS. 20 and 21, when the rotating handle 55 is rotated counterclockwise by approximately 45 degrees to place the adjustment component 50 in the unlocked position, the tightening element 40 is driven forward by the rotation of the rotating portion 552. As a result, a portion of the threaded section 43 is disengaged from the threaded connection with the fastening hole 114, thereby releasing the pressure on the second clamping plate 20 and the first clamping plate 11. This allows the slide rail 32 to slide within the gap between the first arc-shaped groove 111 and the second arc-shaped groove 22 and enable the adjustment of the angle of the rotating base 30.

It should be noted that, by preloading the compression spring 58 to elastically abut against the blocking plate 57, the tightening element 40 is applied with a continuous forward force whether the adjustment component 50 is in the unlocked or locked position. This prevents the external threads of the threaded section 43 from disengaging from the fastening hole 114. As a result, it effectively ensures the stability and reliability of the tightening element 40, thereby preventing the rotating base 30 from being affected by gravity and sliding unintentionally.

In summary, the present disclosure can have various other embodiments. Skilled persons in the art, without departing from the spirit and essence of the present disclosure, can make changes and modifications based on the present disclosure. However, such changes and modifications should be deemed to still fall within the protection scope as claimed by the present disclosure.

What is claimed is:

1. A tripod-head structure for holding a photographic device, the tripod-head structure comprising:
   a first clamping plate, comprising a first arc-shaped groove;
   a second clamping plate, disposed corresponding to the first clamping plate and comprising a second arc-shaped groove;
   a rotating base, comprising a mounting platform and a slide rail, wherein the photographic device is mounted on the mounting platform, the slide rail is vertically connected to the mounting platform, and a portion of the slide rail is disposed between the first arc-shaped groove and the second arc-shaped groove;
   a tightening element, passing through the first clamping plate and the second clamping plate; and
   an adjustment component, disposed in the second clamping plate and connected to the tightening element, wherein the adjustment component is switchable between an unlocked position and a locked position,
   wherein when the adjustment component is in the unlocked position, the slide rail is slidable between the first arc-shaped groove and the second arc-shaped groove to adjust an angle of the rotating base; and
   when the adjustment component is in the locked position, the tightening element presses the first clamping plate and the second clamping plate to clamp and secure the slide rail between the first arc-shaped groove and the second arc-shaped groove.

2. The tripod-head structure according to claim 1, wherein the slide rail comprises a main body, a connecting portion, and a limiting portion, the connecting portion extends perpendicularly from an outer edge of the main body and is connected to the limiting portion, the limiting portion gradually extends outward from the connecting portion, and profiles of the first arc-shaped groove and the second arc-shaped groove are arranged corresponding to shapes of the connecting portion and the limiting portion.

3. The tripod-head structure according to claim 1, wherein the adjustment component comprises a rotary knob, a sleeve, and a positioning pin, the rotary knob is connected to the sleeve, the sleeve comprises a notch and a blind hole communicating with each other, the positioning pin is inserted to the blind hole and comprises a screw hole arranged corresponding to the notch, the first clamping plate comprises a first through slot, the second clamping plate comprises a containing channel and a second through slot communicating with each other, the sleeve is rotatably inserted in the containing channel, the rotary knob is exposed from the second clamping plate, and the tightening element passes through the first through slot, the second through slot, and the notch in sequence and is threadedly fastened to the screw hole.

4. The tripod-head structure according to claim 3, wherein the positioning pin and the sleeve are disposed eccentrically.

5. The tripod-head structure according to claim 3, wherein the tightening element is a shoulder bolt.

6. The tripod-head structure according to claim 1, wherein the adjustment component comprises a lever and a positioning pin, the lever comprises a rotating portion, the rotating portion comprises a notch and a through hole communicating with each other, the positioning pin is inserted to the through hole and comprises a screw hole arranged corresponding to the notch, the first clamping plate comprises a first through slot, the second clamping plate comprises a containing channel and a second through slot communicating with each other, the rotating portion is rotatably accommodated in the containing channel, and the tightening element passes through the first through slot, the second through slot, and the notch in sequence and is threadedly fastened to the screw hole.

7. The tripod-head structure according to claim 6, wherein the positioning pin and the rotating portion are disposed eccentrically.

8. The tripod-head structure according to claim 6, wherein the tightening element is a shoulder bolt.

9. The tripod-head structure according to claim 1, wherein the adjustment component comprises a rotating handle, a fastening element, a blocking plate, and a compression spring, the rotating handle comprises a rotating portion, a blind hole and a recess are respectively arranged on two ends of the rotating portion and communicate with each other, the first clamping plate comprises a fastening hole, the second clamping plate comprises a containing channel and a second through slot communicating with each other, the rotating portion is rotatably accommodated in the containing channel, the tightening element comprises an insertion section, a contact section, and a threaded section connected sequentially, the contact section abuts against a bottom of the blind hole and a bottom of the containing channel to make the insertion section be accommodated in the recess, the fastening element fastens the blocking plate to the insertion section, the compression spring is adapted to sheathe the insertion section and pre-pressingly and elastically abuts against between a bottom of the recess and the blocking plate, and the threaded section passes through the second through slot and is threadedly fastened to the fastening hole.

10. The tripod-head structure according to claim 1, wherein the slide rail is circular-shaped or arc-shaped.

11. The tripod-head structure according to claim 1, further comprising a plurality of bolts, wherein the first clamping plate comprises a plurality of positioning holes, the second clamping plate comprises a plurality of threaded studs, each of the threaded studs is inserted in one of the positioning holes from one side of the first clamping plate, and each of the bolts is inserted in one of the positioning holes from another side of the first clamping plate and is fastened to one of the threaded studs.

* * * * *